US009569070B1

(12) United States Patent
Ma et al.

(10) Patent No.: US 9,569,070 B1
(45) Date of Patent: Feb. 14, 2017

(54) ASSISTING IN DECONFLICTING CONCURRENCY CONFLICTS

(71) Applicant: Palantir Technologies, Inc., Palo Alto, CA (US)

(72) Inventors: Jason Ma, Palo Alto, CA (US); James Thompson, San Francisco, CA (US); Tony Poor, San Mateo, CA (US); Richard Allen Ducott, III, Burlingame, CA (US); Alexander Landau, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 14/076,385

(22) Filed: Nov. 11, 2013

(51) Int. Cl.
*G06F 3/0481* (2013.01)
*G06F 3/0482* (2013.01)
(Continued)

(52) U.S. Cl.
CPC ......... *G06F 3/0482* (2013.01); *G06F 3/04842* (2013.01); *G06F 3/0481* (2013.01);
(Continued)

(58) Field of Classification Search
CPC .. G06F 3/0481; G06F 3/0482; G06F 3/04817; G06F 9/4443; G06F 17/30575; G06F 17/30578; G06F 17/30067; H04L 29/08306; H04L 29/0854
(Continued)

(56) References Cited

U.S. PATENT DOCUMENTS 5,548,749 A 8/1996 Kroenke et al.
5,708,828 A 1/1998 Coleman
(Continued)

FOREIGN PATENT DOCUMENTS

AU 2011279270 1/2013
EP 0816968 1/1996
(Continued)

OTHER PUBLICATIONS

Altmanninger et al., "A Categorization for Conflicts in Model Versioning," Elektrotechnik & Informationstechnik (2011 ), 128/11-12:421-426.*

(Continued)

*Primary Examiner* — Eric J Bycer
(74) *Attorney, Agent, or Firm* — Hickman Palermo Becker Bingham LLP; Adam C. Stone

(57) ABSTRACT

Systems, methods, and graphical user interfaces are disclosed that assist a user in deconflicting concurrency conflicts in a peering network in which ambiguous concurrency conflicts can arise. In accordance with some embodiments, a method for assisting a user in deconflicting concurrency conflicts is disclosed. The method includes detecting a plurality of ambiguous data conflicts between the local deployment and the peer deployment. The method further includes providing a graphical user interface to a user at the local deployment that allows the user to filter the plurality of ambiguous data conflicts according to a selected data conflict type of a plurality of predefined data conflict types selectable by the user through the graphical user interface. By providing such as graphical user interface, the user can easily filter a large number (e.g., hundreds) of ambiguous concurrency conflicts that may exist at a given time between the local deployment and the peer deployment.

18 Claims, 14 Drawing Sheets

(51) Int. Cl.
  *G06F 9/44* (2006.01)
  *G06F 17/30* (2006.01)
  *H04L 29/08* (2006.01)
  *G06F 3/0484* (2013.01)

(52) U.S. Cl.
  CPC ........ *G06F 3/04817* (2013.01); *G06F 9/4443* (2013.01); *G06F 17/30067* (2013.01); *G06F 17/30575* (2013.01); *G06F 17/30578* (2013.01); *H04L 29/0854* (2013.01); *H04L 29/08306* (2013.01)

(58) Field of Classification Search
  USPC ........ 707/613, 614, 622, 634; 715/810, 825, 715/835, 853, 854
  See application file for complete search history.

(56) References Cited

U.S. PATENT DOCUMENTS

| | | | |
|---|---|---|---|
| 5,765,171 A | 6/1998 | Gehani et al. | |
| 5,774,717 A * | 6/1998 | Porcaro | |
| 5,806,074 A * | 9/1998 | Souder et al. | |
| 5,870,761 A | 2/1999 | Demers et al. | |
| 5,943,676 A * | 8/1999 | Boothby | G06F 17/30578 |
| 6,098,078 A * | 8/2000 | Gehani et al. | 707/610 |
| 6,190,053 B1 | 2/2001 | Stahlecker et al. | |
| 6,202,085 B1 | 3/2001 | Benson et al. | |
| 6,216,140 B1 | 4/2001 | Kramer | |
| 6,240,414 B1 * | 5/2001 | Beizer et al. | |
| 6,295,541 B1 * | 9/2001 | Bodnar et al. | |
| 6,317,754 B1 * | 11/2001 | Peng | 707/610 |
| 6,374,252 B1 | 4/2002 | Prasad et al. | |
| 6,539,381 B1 * | 3/2003 | Prasad et al. | |
| 6,560,620 B1 | 5/2003 | Ching | |
| 6,816,941 B1 | 11/2004 | Carlson et al. | |
| 7,072,911 B1 | 7/2006 | Doman | |
| 7,167,877 B2 | 1/2007 | Balogh et al. | |
| 7,437,664 B2 | 10/2008 | Borson | |
| 7,523,146 B2 * | 4/2009 | Holt et al. | |
| 7,596,285 B2 | 9/2009 | Brown et al. | |
| 7,676,788 B1 | 3/2010 | Ousterhout et al. | |
| 7,730,396 B2 | 6/2010 | Chidlovskii et al. | |
| 7,805,408 B2 * | 9/2010 | Padgett et al. | 707/634 |
| 7,818,297 B2 | 10/2010 | Peleg et al. | |
| 7,877,421 B2 | 1/2011 | Berger et al. | |
| 7,962,495 B2 | 6/2011 | Jain et al. | |
| 8,015,151 B2 | 9/2011 | Lier et al. | |
| 8,290,990 B2 | 10/2012 | Drath et al. | |
| 8,301,904 B1 | 10/2012 | Gryaznov | |
| 8,312,546 B2 | 11/2012 | Alme | |
| 8,316,060 B1 | 11/2012 | Snyder et al. | |
| 8,380,659 B2 | 2/2013 | Zunger | |
| 8,442,940 B1 | 5/2013 | Faletti et al. | |
| 8,515,912 B2 | 8/2013 | Garrod et al. | |
| 8,527,461 B2 | 9/2013 | Ducott, III et al. | |
| 8,646,080 B2 | 2/2014 | Williamson et al. | |
| 8,688,749 B1 | 4/2014 | Ducott, III et al. | |
| 8,726,379 B1 | 5/2014 | Stiansen et al. | |
| 8,782,004 B2 | 7/2014 | Ducott, III et al. | |
| 8,838,538 B1 | 9/2014 | Landau et al. | |
| 8,886,601 B1 | 11/2014 | Landau et al. | |
| 9,009,827 B1 | 4/2015 | Albertson et al. | |
| 2003/0055825 A1 * | 3/2003 | Chen et al. | 707/10 |
| 2003/0084017 A1 | 5/2003 | Ordille | |
| 2003/0088654 A1 | 5/2003 | Good et al. | |
| 2003/0182313 A1 | 9/2003 | Federwisch et al. | |
| 2004/0103124 A1 | 5/2004 | Kupkova | |
| 2004/0111390 A1 | 6/2004 | Saito et al. | |
| 2004/0250576 A1 | 12/2004 | Flanders | |
| 2005/0034107 A1 | 2/2005 | Kendall et al. | |
| 2005/0044187 A1 * | 2/2005 | Jhaveri et al. | 709/219 |
| 2005/0050537 A1 * | 3/2005 | Thompson et al. | 717/165 |
| 2005/0108063 A1 | 5/2005 | Madill et al. | |
| 2005/0193024 A1 * | 9/2005 | Beyer et al. | 707/200 |
| 2006/0036568 A1 * | 2/2006 | Moore et al. | 707/1 |
| 2006/0106879 A1 * | 5/2006 | Zondervan et al. | 707/200 |
| 2006/0155945 A1 * | 7/2006 | McGarvey | 711/162 |
| 2006/0190497 A1 | 8/2006 | Inturi et al. | |
| 2006/0206866 A1 | 9/2006 | Eldrige et al. | |
| 2006/0218637 A1 | 9/2006 | Thomas et al. | |
| 2006/0224579 A1 | 10/2006 | Zheng | |
| 2006/0242204 A1 * | 10/2006 | Karas et al. | 707/200 |
| 2007/0005707 A1 | 1/2007 | Teodosiu et al. | |
| 2007/0026373 A1 | 2/2007 | Suriyanarayanan et al. | |
| 2007/0112887 A1 | 5/2007 | Liu et al. | |
| 2007/0130217 A1 * | 6/2007 | Linyard et al. | 707/201 |
| 2007/0168516 A1 | 7/2007 | Liu et al. | |
| 2007/0180075 A1 * | 8/2007 | Chasman et al. | 709/223 |
| 2007/0220328 A1 | 9/2007 | Liu et al. | |
| 2007/0233756 A1 | 10/2007 | D'Souza et al. | |
| 2007/0299887 A1 * | 12/2007 | Novik et al. | 707/203 |
| 2008/0027981 A1 | 1/2008 | Wahl | |
| 2008/0033753 A1 | 2/2008 | Canda et al. | |
| 2008/0086718 A1 | 4/2008 | Bostick et al. | |
| 2008/0141117 A1 | 6/2008 | King et al. | |
| 2008/0148398 A1 | 6/2008 | Mezack et al. | |
| 2008/0189240 A1 | 8/2008 | Mullins et al. | |
| 2008/0235575 A1 | 9/2008 | Weiss | |
| 2008/0243951 A1 | 10/2008 | Webman et al. | |
| 2008/0320299 A1 | 12/2008 | Wobber et al. | |
| 2009/0172821 A1 | 7/2009 | Daira et al. | |
| 2009/0199090 A1 | 8/2009 | Poston et al. | |
| 2009/0228507 A1 * | 9/2009 | Jain et al. | 707/102 |
| 2009/0254970 A1 | 10/2009 | Agarwal et al. | |
| 2010/0011000 A1 | 1/2010 | Chakra et al. | |
| 2010/0100963 A1 | 4/2010 | Mahaffey | |
| 2010/0145909 A1 | 6/2010 | Ngo | |
| 2010/0330801 A1 | 12/2010 | Rouh | |
| 2011/0010342 A1 | 1/2011 | Chen et al. | |
| 2011/0145187 A1 * | 6/2011 | Himmelsbach et al. | 707/610 |
| 2011/0219450 A1 | 9/2011 | McDougal et al. | |
| 2011/0246229 A1 | 10/2011 | Pacha | |
| 2012/0005159 A1 | 1/2012 | Wang et al. | |
| 2012/0016849 A1 * | 1/2012 | Garrod et al. | 707/695 |
| 2012/0023075 A1 | 1/2012 | Pulfer et al. | |
| 2012/0036106 A1 | 2/2012 | Desai et al. | |
| 2012/0136839 A1 * | 5/2012 | Eberlein et al. | 707/690 |
| 2012/0210294 A1 * | 8/2012 | Gores | G06F 8/71 717/105 |
| 2012/0254129 A1 | 10/2012 | Wheeler et al. | |
| 2013/0006655 A1 | 1/2013 | Van Arkel et al. | |
| 2013/0006668 A1 | 1/2013 | Van Arkel et al. | |
| 2013/0067017 A1 | 3/2013 | Carriere et al. | |
| 2013/0173540 A1 | 7/2013 | Qian et al. | |
| 2013/0191336 A1 | 7/2013 | Ducott et al. | |
| 2013/0191338 A1 | 7/2013 | Ducott, III et al. | |
| 2013/0276799 A1 | 10/2013 | Davidson | |
| 2013/0346444 A1 | 12/2013 | Makkar et al. | |
| 2014/0040182 A1 | 2/2014 | Gilder et al. | |
| 2014/0040714 A1 | 2/2014 | Siegel et al. | |
| 2014/0081652 A1 | 3/2014 | Klindworth | |
| 2014/0114972 A1 | 4/2014 | Ducott et al. | |
| 2014/0129518 A1 | 5/2014 | Ducott et al. | |
| 2014/0149130 A1 | 5/2014 | Getchius | |
| 2015/0074050 A1 | 3/2015 | Landau et al. | |
| 2015/0235334 A1 | 8/2015 | Wang et al. | |
| 2015/0261847 A1 | 9/2015 | Ducott et al. | |
| 2016/0019252 A1 | 1/2016 | Ducott et al. | |

FOREIGN PATENT DOCUMENTS

| | | |
|---|---|---|
| EP | 1647908 | 4/2006 |
| EP | 2911078 | 8/2015 |
| WO | WO 2008/113059 | 9/2008 |
| WO | WO 2011/161565 | 12/2011 |
| WO | WO 2012/009397 | 1/2012 |

OTHER PUBLICATIONS

Canadian Intellectual Property Office, "Office Action" in application No. 2,666,364, dated Oct. 3, 2013, 2 pages.

(56) References Cited

OTHER PUBLICATIONS

Current Claims in application No. 2,666,364 dated Oct. 2013, 7 pages.
U.S. Appl. No. 12/836,801, filed Jul. 15, 2010, Notice of Allowance, Apr. 16, 2013.
Sanford T. Cob & Co. Intellectual Property Law, "Office Action" in application No. 198253, dated Nov. 27, 2013, 4 pages.
Current Claims in application No. 198253, dated Nov. 2013, 7 pages.
Holliday, JoAnne, "Replicated Database Recovery using Multicast Communication," IEEE 2002, pp. 11.
Lamport, "Time, Clocks and the Ordering of Events in a Distributed System," Communications of the ACM, Jul. 1978, vol. 21, No. 7, pp. 558-565.
Loeliger, Jon, "Version Control with Git," O'Reilly, May 2009, pp. 330.
O'Sullivan, Bryan, "Making Sense of Revision Control Systems," Communications of the ACM, Sep. 2009, vol. 52, No. 9, pp. 57-62.
Parker, Jr. et al., "Detection of Mutual Inconsistency in Distributed Systems," IEEE Transactions in Software Engineering, May 1983, vol. SE-9, No. 3, pp. 241-247.
Official Communication for Israel Patent Application No. 198253 dated Nov. 24, 2014.
Claims in Israel Application No. 198523, dated Nov. 2014, 8 pages.
Fidge, Colin, "Timestamps in Message-Passing Systems That Preserve the Partial Ordering", Australian Computer Science Communications, vol. 10 No. 1 dated Feb. 1988, 11 pages.
Mattern, Friedemann, "Virtual Time and Global States of Distributed Systems", Proceedings of the International Workshop on Parallel and Distributed Alorithms, dated Oct. 1988, 15 pages.
U.S. Appl. No. 13/657,684, filed Oct. 22, 2012, Office Action, Aug. 28, 2014.
U.S. Appl. No. 14/473,860, filed Aug. 29, 2014, Notice of Allowance, Jan. 5, 2015.
U.S. Appl. No. 14/473,860, filed Aug. 29, 2014, Notice of Allowance, Feb. 27, 2015.
U.S. Appl. No. 14/518,757, filed Oct. 20, 2014, Office Action, Dec. 1, 2015.
U.S. Appl. No. 14/156,208, filed Jan. 15, 2014, Office Action, Mar. 9, 2015.
U.S. Appl. No. 14/156,208, filed Jan. 15, 2014, Notice of Allowance, Feb. 12, 2016.
U.S. Appl. No. 14/334,232, filed Jul. 17, 2014, Notice of Allowance, Nov. 10, 2015.
U.S. Appl. No. 14/286,485, filed May 23, 2014, Notice of Allowance, Jul. 29, 2015.
U.S. Appl. No. 14/334,232, filed Jul. 17, 2014, Office Action, Jul. 10, 2015.
U.S. Appl. No. 14/518,757, filed Oct. 20, 2014, Final Office Action, Jul. 20, 2015.
U.S. Appl. No. 14/286,485, filed May 23, 2014, Office Action Interview, Apr. 30, 2015.
U.S. Appl. No. 14/518,757, filed Oct. 20, 2014, Office Action Interview, Apr. 2, 2015.
U.S. Appl. No. 13/657,684, filed Oct. 22, 2012, Notice of Allowance, Mar. 2, 2015.
U.S. Appl. No. 14/286,485, filed May 23, 2014, Pre-Interview Office Action, Mar. 12, 2015.
U.S. Appl. No. 14/156,208, filed Jan. 15, 2014, Final Office Action, Aug. 11, 2015.
U.S. Appl. No. 14/156,208, filed Jan. 15, 2014, Interview Summary, Sep. 17, 2015.
Dell Latitude D600 2003, Dell Inc., http://www.dell.com/downloads/global/products/latit/en/spec_latit_d600_en.pdf.
Dou et al., "Ontology Translaation on the Semantic Web 2005," Springer-Verlag, Journal on Data Semantics II Lecture Notes in Computer Science, vol. 3350, pp. 35-57.
Owl Web Ontology Language Reference Feb. 4, W3C, http://www.w3.org/TR/owl-ref/ Note: Only TOC provided, pp. 1-3.
Symantec Corporation, "E-Security Begins with Sound Security Policies," Announcement Policies, Jun. 14, 2001.
Official Communication for European Patent Application No. 15156004.2 dated Aug. 24, 2015.
Official Communication for European Patent Application No. 15155845.9 dated Oct. 6, 2015.
Official Communication for Canadian Patent Application No. 2806954 dated Jan. 15, 2016.
Official Communication for European Patent Application No. 14159175.0 dated Feb. 4, 2016.

* cited by examiner

ASSISTING IN DECONFLICTING CONCURRENCY CONFLICTS

RELATED APPLICATIONS

This application is related to U.S. patent application Ser. No. 11/602,626, entitled "Creating Data in a Data Store Using a Dynamic Ontology", filed Nov. 20, 2006 (now U.S. Pat. No. 7,962,495), the entire contents of which is hereby incorporated by reference as if fully set forth herein.

TECHNICAL FIELD

The present invention relates generally to multimaster database systems, and in particular to assisting a user in deconflicting concurrency conflicts in a multimaster database system.

BACKGROUND

In many multimaster database systems, data is stored in a group of databases, data changes may be made to any member of the group, and a data change made to one member is propagated to the rest of the group. Multimaster database systems typically implement either a synchronous or an asynchronous replication scheme for propagating a change made to one database to the rest of the databases in the group.

With some synchronous multimaster replication schemes, each change is applied to all databases in the group immediately or to none of the databases if one or more of the databases in the group cannot accept the change. For example, one of the databases may be offline or unavailable. Synchronous multimaster replication is sometimes achieved using a two-phase commit protocol.

In contrast, with some asynchronous multimaster replication schemes, a change made to a database is immediately accepted by the database but propagation of the change to other databases in the group may be deferred. Because propagation of changes may be deferred, if one or more of the databases in the group are unavailable, the available databases can still accept changes, queuing the changes locally until they can be propagated. For this reason, multimaster database systems employing an asynchronous replication strategy are sometimes considered to be more highly available than multimaster database systems employing a synchronous replication strategy. Unfortunately, asynchronous multimaster replication brings with it the possibility of concurrency conflicts that occur as a result of concurrent database changes made at multiple databases.

A concurrency conflict can arise in a multimaster database system when the same data is changed differently in two different databases before either one of those changes can be propagated to the other. For example, assume data representing a particular person's eye color is changed to "brown" in database A, and after that change but before that change can be propagated to database B, data representing the particular person's eye color is changed to "green" in database B. Without additional information, it is unclear which change is the correct change that should be adopted by all databases in the system.

Multimaster database systems employing an asynchronous replication scheme typically provide mechanisms for "deconflicting" concurrency conflicts. As used herein, the term "deconflict", refers generally to detecting and resolving a concurrency conflict such that resolution of the conflict is eventually adopted by all databases in the system. In some cases, the multimaster database system may be able to automatically deconflict a concurrency conflict without requiring user intervention. In other cases, user intervention may be needed or desired to determine which of the concurrent changes should be adopted as the correct one.

It would be desirable to provide assistance to users in evaluating and deconflicting concurrency conflicts where user intervention is needed or desired.

BRIEF DESCRIPTION OF DRAWINGS

The aforementioned features of the invention as well as additional features and advantages thereof will be more clearly understood as a result of a detailed description of embodiments of the invention when taken in conjunction with the drawings. Like reference numerals refer to corresponding parts throughout the several views of the drawings.

DETAILED DESCRIPTION OF EMBODIMENTS

Overview

Systems, methods, and graphical user interfaces are disclosed that assist a user in deconflicting concurrency conflicts in a peering network in which "ambiguous" concurrency conflicts can arise. Here, ambiguous refers to concurrency conflicts for which it is needed or desired to have a human user evaluate and resolve the concurrency conflict as opposed to having the concurrency conflict automatically resolved according to a heuristic or rule by a computer.

In accordance with some embodiments, a method for assisting a user in deconflicting concurrency conflicts is disclosed. The method includes detecting a plurality of ambiguous data conflicts between the local deployment and the peer deployment. The method further includes providing a graphical user interface to a user at the local deployment that allows the user to filter the plurality of ambiguous data conflicts according to a selected data conflict type of a plurality of predefined data conflict types selectable by the user through the graphical user interface. By providing such as graphical user interface, the user can easily filter a large number (e.g., hundreds) of ambiguous concurrency conflicts that may exist at a given time between the local deployment and the peer deployment.

In accordance with some embodiments, the method further includes: receiving a selection by the user through the graphical user interface of the selected data conflict type; determining a subset of the plurality of ambiguous data conflicts that are of the selected data conflict type; and providing graphical user interface controls that allow the user to resolve all of the subset of ambiguous data conflicts at the same time without requiring the user to resolve each of the ambiguous data conflicts individually. By providing such graphical user interface controls, the user can resolve all ambiguous data conflicts in a data conflict type-specific subset of all of the ambiguous data conflicts currently pending between the local deployment and the peer deployment at the same time and in the same way without having to resolve each data conflict in the subset one at a time.

Peering Network

Figure 1:
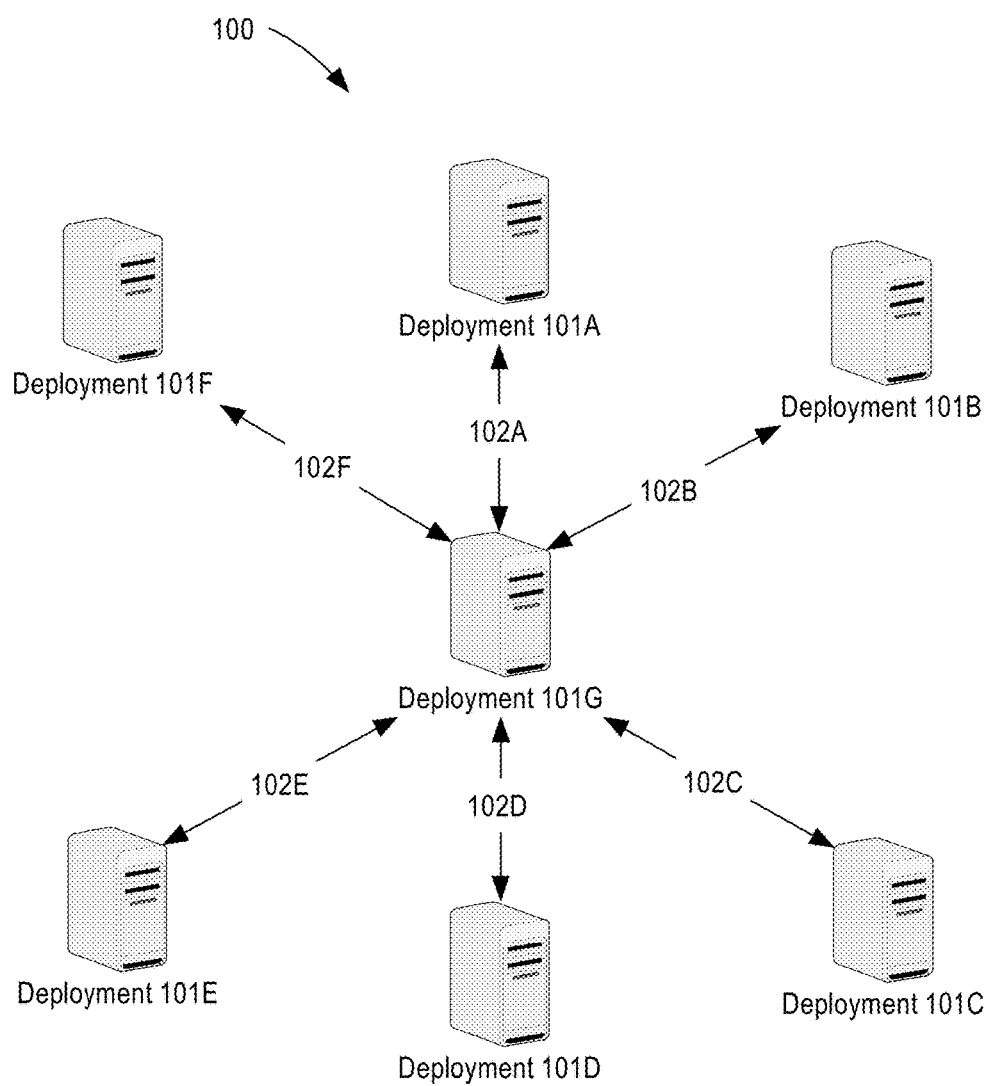
FIG. 1 illustrates an example peering network in which some embodiments of the present invention may be implemented.

FIG. 1 illustrates an example peering network 100 in which some embodiments of the present invention may be implemented. The peering network 100 includes seven deployments 101A, 101B, 101C, 101D, 101E, 101F, and 101G (generally, "101"). Peering network 100 may include more or fewer deployments 101 in other embodiments.

A deployment 101 can have one or more peering relationships 102 with one or more other deployments 101. For example, in network 100, deployment 101A has peering relationship 102A with deployment 102G, deployment 101B has peering relationship 102B with deployment 102G, deployment 101C has peering relationship 102C with deployment 102G, deployment 101D has peering relationship 102D with deployment 102G, deployment 101E has peering relationship 102E with deployment 102G, and deployment 101F has peering relationship 102F with deployment 102G.

Figure 2:
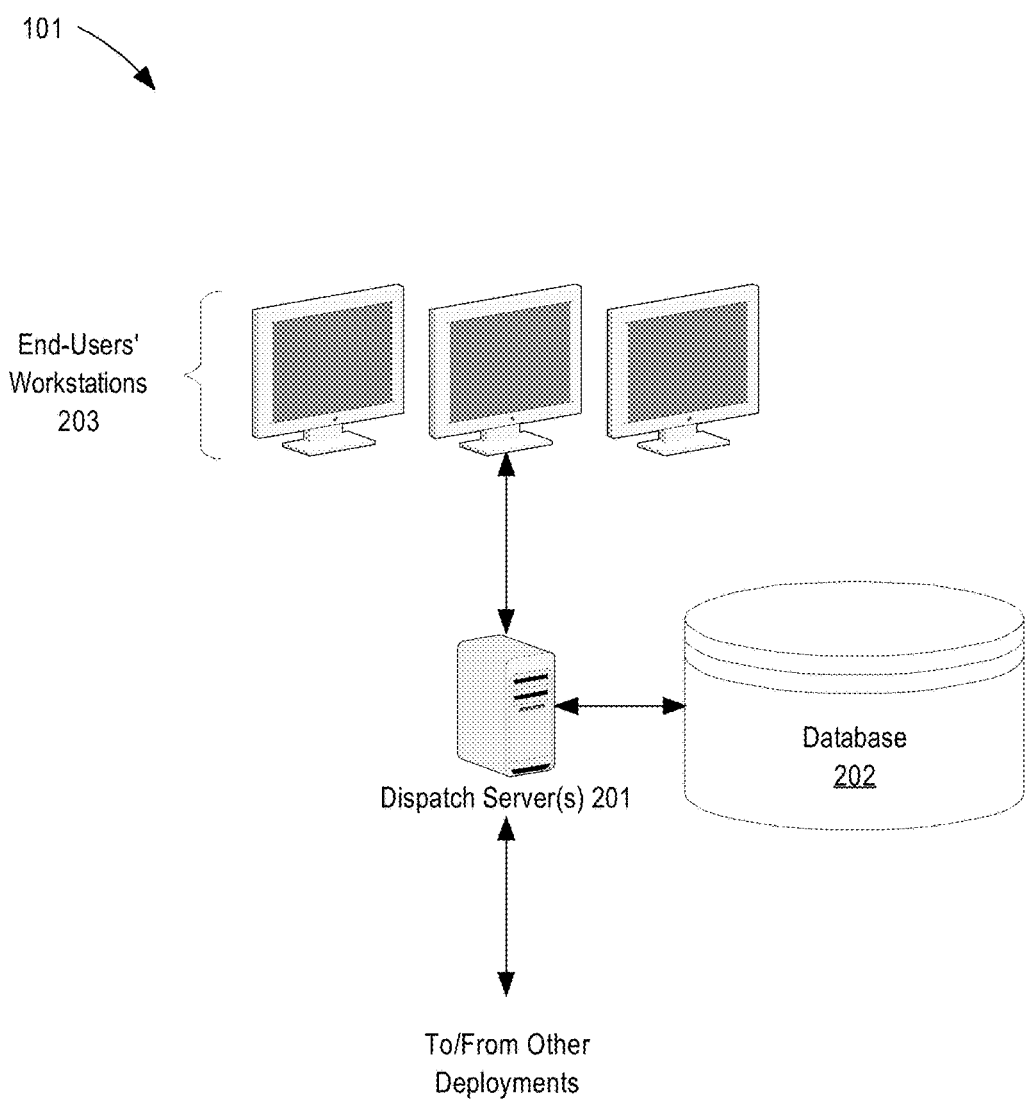
FIG. 2 illustrates an exemplary computing architecture that may exist at a deployment in a peering network according to some embodiments of the present invention.
Figure 3:
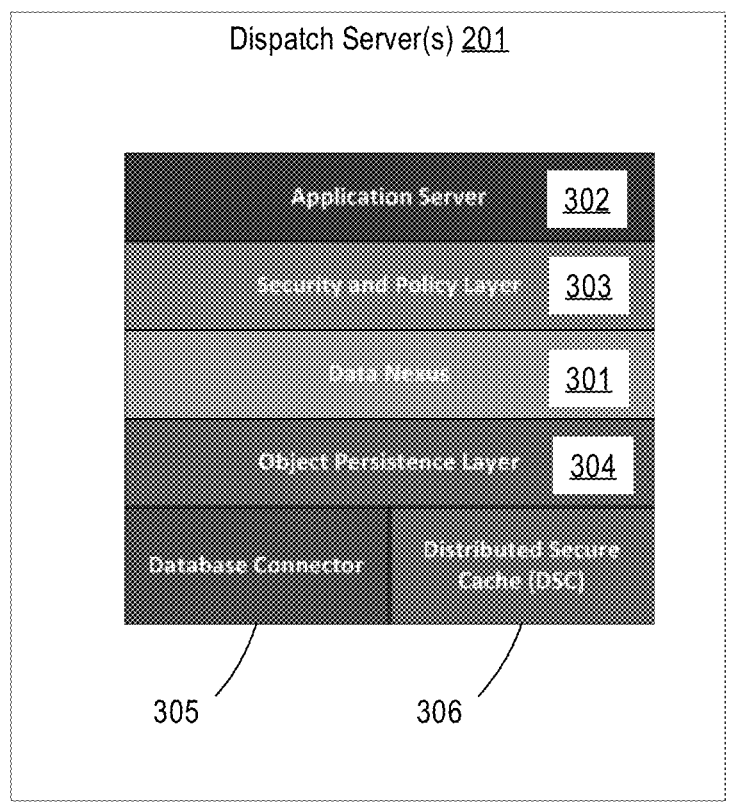
FIG. 3 illustrates some possible components of a dispatch server at a deployment in a peering network according to some embodiments of the present invention.

A peering relationship 102 allows a pair of deployments 101 to share a consistent view of their data by synchronizing their "data nexuses". As shown in FIG. 2, a deployment 101 may have a dispatch server 201 that is operatively coupled to a database 202. As shown in FIG. 3, a dispatch server 201 may have a data-integration layer 301 referred to herein as the "data nexus layer" or just "data nexus". Synchronization in the context of a peering relationship 102 may occur at the data nexus layer 301 of the dispatch servers 102 at the pair of deployments 101 that are members of the peering relationship 102.

While in some embodiments, as exemplified by network 100 of FIG. 1, peering relationships 102 in peering network 100 form a hub-and-spoke topology, peering relationships 102 in network 100 form other topologies in other embodiments. For example, deployment 102A could have a peering relationship 102 with deployment 101B, 101C, 101D, 101E, 101F, or another deployment (not shown) in addition to the peering relationship 102A it has with deployment 101G.

Peering relationships 102 may be dependent. For example, when the data nexus 301 at deployment 101G peers with the data nexus 301 at deployment 102A, they may synchronize their data nexuses 301 such that the data nexus 301 at deployment 101G now includes the data nexus 301 at deployment 101A. When the data nexus 301 at deployment 101G then peers with the data nexus 301 at deployment 101B, the data nexus 301 at deployment 101G synchronized with the data nexus 301 at deployment 101A may be peered with the data nexus 301 at deployment 101B. As a result, the data nexus 301 at deployment 101B may now also include the data nexus 301 at deployment 101A.

Peering of data nexuses 301 can be by data network or by file. If by data network, then synchronization of data nexuses 301 occurs over a network connection (e.g., a TCP/IP-based connection) between the pair of deployments 101. The network connection may be established intermittently on an as needed basis. In other words, a continuous or steady network connection is not required for synchronization. If peering by file, then synchronization may be occur by physical transportation of physical storage media between the pair of deployments 101 such as, for example, on compact discs (CDs) or digital versatile discs (DVDs). A peering network can contain a mix of data network-based peering relationships 102 and file-based peering relationships 102.

A peering relationship 102 can be bi-directional or one-way. If bi-directional, the pair of deployments 101 having the peering relationship 102 transmit and receive each other's data. If one-way, only one of the deployments 101 in the pair transmits their local data nexus 301 to the other deployment 101. As an example, deployment 101G may have a bi-directional data network-based peering relationship 102A with deployment 101A, another bi-directional data network-based peering relationship 102B with deployment 101B, and a one-way file-based peering relationship 101C with deployment 101C.

In some embodiments, only a subset of a data nexus 301 at a deployment 101 is peered with another deployment 101 in a peering relationship 102 between the two deployments 101. The subset may be defined by a user-configurable filter that limits the data of the data nexus 301 that is exported to the other deployment 101. For example, a filter may be defined that excludes especially sensitive data (e.g., social security numbers, classified information, etc.) of the data nexus 301 from the peered subset.

Deployment Computing Architecture

FIG. 2 illustrates an exemplary computing architecture that may exist at a deployment 101 in peering network 100 according to some embodiments of the present invention. The architecture includes one or more dispatch servers 201 (collectively, "dispatch server 201") which is operatively coupled to a database 202. One or more end-user workstations 203 is also operatively coupled to dispatch server 201.

Dispatch server 201 may be implemented on one or more computing devices such as one or more personal, desktop, workstation, or server computing devices.

Database 202 may include a database management system such as a commercially available database management system, an open source-based database management system, or a proprietary database management system.

End-user workstations 203 can include, but are not limited to, personal, desktop, workstation, or server computing devices. In some embodiments, two or more of an end-users' workstation, the dispatch server 201, and the database 202 are implemented on the same computing device or the same set of computing devices.

The dispatch server 201 of a deployment 101 may operate as the gateway to other deployments 101 in the peering network 100. The dispatch server 201 may also handle business logic, manage security and policy controls, and respond to user requests.

FIG. 3 illustrates possible components of the dispatch server 201 according to some embodiments of the present invention. As shown in FIG. 3, a dispatch server 201 may include an application server layer 302, a security and policy layer 303, a data nexus layer 301, an object persistence layer 304, a database connector 305, and a distributed secure cache 306.

Application server layer 302 may include one or more applications. Each application may be a primary component of a "workspace", or software that provides a platform enabling collaboration among end-users across organizational and geographic boundaries. Each application may provide a set of related features and functionality that is used by end-users to work in "investigations". An "investigation" may include, but is not necessarily limited to, a collection of information related to an inquiry. The inquiry may include adding information to the collection, removing information from the collection, changing information in the collection, searching for information in the collection, and viewing information in the collection.

Each investigation may contain a unique "investigative realm", or a domain of an investigation, that contains the collection of information. Each investigative realm may be stored in an investigative repository portion of database 202 and may provide virtual views of data stored in a data repository portion of database 202. End-users may create and edit data in their investigative realms without affecting data in the data repository portion until changes in the investigative repository portion are published to the data repository portion.

The investigatory repository portion of database 202 may store a collection of investigations being conducted at the deployment 101. End-users may search, view, and open investigations to which they have access privileges as enforced by security and policy layer 303. The data repository portion of database 202 may store a complete view of all data at the deployment 101. End-users may publish new and changed information to the data repository portion to share it with other end-users in the same deployment 101. In addition or alternatively, information may be imported directly in to the data repository portion.

Information in the data repository portion of database 202 at a deployment 101 in network 100 may be shared with other deployments 101 in the network 100 through data nexus peering. As discussed above, peering is a feature that allows pairs of deployments 101 to share their data by synchronizing their data nexuses 301. The data nexus 301 may include, but is not necessarily limited to, a data-integration layer in a dispatch server 201. In some embodiments, only the data nexus layer 301 is shared between pairs of deployments 101 through data nexus peering and the other layers 302, 303, 304, 305, and 306 are not shared through data nexus peering.

One of the applications of the application server layer 302 may be a pending changes application. End-users may use the pending changes application to resolve ambiguous concurrency conflicts between data in the data repository portion of the database 202 and data entering the deployment 101 through data nexus peering. Exemplary user interfaces of the pending changes application for assisting users in deconflicting ambiguous concurrency conflicts are shown in the figures and described in greater detail hereinafter.

The dispatch server 201 may also contain a security and policy layer 303 for managing security and policy controls and for restricting user requests in accordance with current security and policy controls.

The dispatch server 201 may also contain an object persistence layer 304 for persistently storing data objects in database 202. A data object may include, but is not necessarily limited to, data that represents an entity (e.g., a person, place, or thing), an event, or a document. Data object types may be defined in a dynamic ontology used to model data in database 202. An example of a dynamic ontology that may be used to define data object types is described in related U.S. patent application Ser. No. 11/602,626, entitled "Creating Data in a Data Store Using a Dynamic Ontology", filed Nov. 20, 2006 (now U.S. Pat. No. 7,962,495), the entire contents of which is hereby incorporated by reference as if fully set forth herein.

The dispatch server 201 may also contain one or more database connectors 305 (collectively, "database connector layer 305") for interfacing with various databases one of which may be database 202. Database connector layer 305 may interface with other databases for purposes of importing data from the other databases into database 202, for purposes of exporting data from database 202 to the other database, or for other purposes.

The dispatch server 201 may also include a distributed secure caching layer 306 to reduce the query and update load on database 202, to avoid unnecessary recalculations, and minimize access to disk. The cache may be distributed among multiple dispatch servers 201 at a deployment 101.

Object-Centric Data Model

Figure 4:
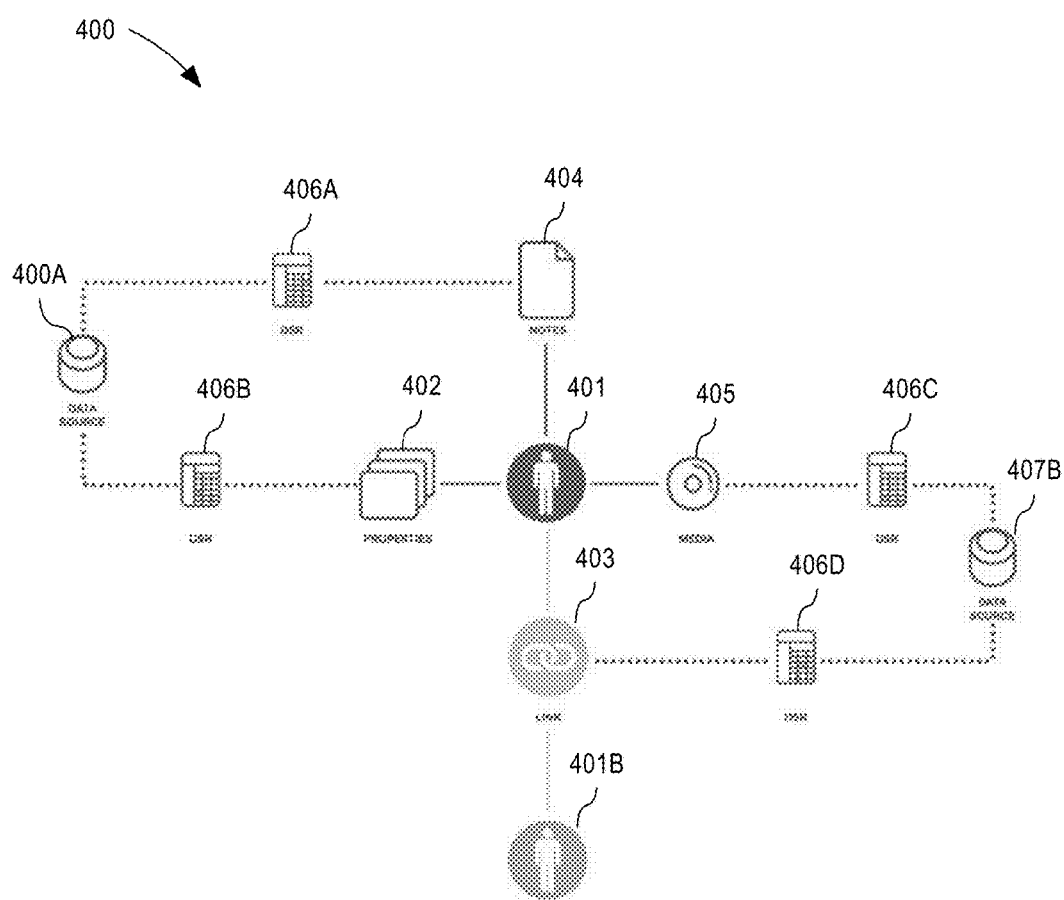
FIG. 4 illustrates an example object-centric data model by which data stored in a database at a deployment in a peering network may be organized according to some embodiments of the present invention.

Data stored in database 202 may be organized according to an object-centric data model. However, an object-centric data model is not required of the present invention and other data models may be used. FIG. 4 illustrates an example object-centric data model 400 by which data stored in database 202 may be organized according to some embodiments of the present invention.

Model 400 includes data objects 401. Data objects 401 may include, but are not necessarily limited to, containers for data representing things in the world. Example types of data objects 401 include entity data objects 401, event data objects 401, and document data objects 401. Entity data objects 401 may include, but are not necessarily limited to, containers for data representing people, places, or other nouns. Event data objects 401 may include, but are not necessarily limited to, containers for data representing something that happens at a point in time or for a duration. Document data objects 401 may include, but are not necessarily limited to, containers for data representing unstructured data sources such as e-mail messages or news reports.

A data object 401 may contain only a display name and a unique identifier but otherwise hold no other data. A data object 401 may contain one or more object components including one or more properties 402, one or more links 403, one or more notes 404, and one or more media components 405. A data object 401 may contain multiple object components. For example, a person data object 401 can have multiple name properties 402.

A property 402 is an attribute of a data object 401 and represent individual data items such as name for a person data object 401 or a phone number for a phone data object 401.

A link 403 is any connection between two data objects 401 such as, for example, a relationship between two person data objects 401 or a member-of relationship between a person data object 401 and a religious organization data object 401.

A note 404 may include any free-form text for end-user entry that is associated with a data object 401.

A media component 405 may contain audio or video samples related to a data object 401. For example, a digital photograph of a person may be associated with a corresponding person data object 401 as a media component 405.

A property 402, a link 403, a note 404, and a media component 405 may each be secured by an associated data source record 406. The data source record 406 tracks the associated object component's data source 407. A data source 407 can include, but not necessarily limited to, a database, a file, or an end-user that is the source of properties 402, links 403, notes 404, or media 405. Data source records 406 may be used to track the data source 407 of the information of each object component 402, 403, 404, and 405 so that end-users can track where the information came from. A data source record 406 may also be associated with an access control list that specifies the end-users or groups of end-users that have access to the object component 402, 403, 404, or 405 associated with the data source record 406 and their level of permission. Example permissions may include no access, discovery access, read access, write access, and owner access. Higher levels of permission may include the lower levels. For example, the write permission may include the read and discovery permissions but not the owner permission.

At the highest level of abstraction, model 400 is free of domain-specific semantics. For example, there is not necessarily any inherent meaning associated with a relationship between two data objects 401 or with a particular property 402 on a data object 401. As such, the model 400 allows virtually total flexibility in modeling a specific problem domain. Domain-specific semantics of the model 400 may be defined by end-users in a dynamic ontology according to the requirements of the particular problem domain at hand. An example of a dynamic ontology that may be used to define problem domain-specific semantics of model 400 is described in related U.S. patent application Ser. No. 11/602,626, entitled "Creating Data in a Data Store Using a Dynamic Ontology", filed Nov. 20, 2006 (now U.S. Pat. No. 7,962,495), the entire contents of which is hereby incorporated by reference as if fully set forth herein.

By abstracting semantics from structure, end-users can model a wide range of problem domains with great flexibility. In some embodiments, database 202 is a relational database and data organized according to model 400 is stored in the relational database according to a schema with five tables, one table each for objects 401, properties 402, notes 404, media 405, and links 403. In some embodiments, no new tables are required to be added to the schema in the underlying relational database when new types are added to the dynamic ontology.

While in some embodiments data organized according to model 400 is stored in a relational database having a schema with five tables as described above, data organized according to model 400 is stored in another type of database or in a relational database with a different schema in other embodiments. For example, data organized according to model 400 may be stored in a distributed key-value data store or stored in a relational database having a schema with more than five tables or fewer than five tables.

Detecting Concurrency Changes

In accordance with some embodiments, a concurrency conflict can occur when a concurrent, non-matching change to the same data object 401 is made on both sides of a peering relationship 102. In this context, concurrent does not refer to the same instant in time. Rather, concurrent changes include, but are not necessarily limited to, changes that cause vector clocks to increment at both deployments 101 of the peering relationship 102 before a next peering event between the deployments 101.

In some embodiments, vector clocks are maintained at each deployment 101 in a peering network 101 on a per-data object 401 basis to determine whether changes to the same data object 401 are concurrent. In particular, vector clocks may be used at each deployment 101 to determine the sequence in which changes are made to data objects 401. In some embodiments, when a deployment 101 peers a change to a data object 401 to the peer deployment 101 of a peering relationship 102, the peer deployment 101 compares its version vector for the data object 401 to peering deployment's 101 version vector for the data object 401 to determine whether peered changed happened before, happened after, or neither happened before nor happened after (i.e., happened concurrently with) a change to the data object 401 at the peer deployment 101. Further information on using vector clocks to determine causality relationships between events such as data change events can be found in the paper by Colin J. Fidge, "Timestamps in Message-Passing Systems", In K. Raymond (Ed.) *Proc. of the 11th Australian Computer Science Conference* (ACSC 1988), pp. 56-66 and the paper Mattern, F., "Virtual Time and Global States of Distributed Systems", in Cosnard, M., Proc. *Workshop on Parallel and Distributed Algorithms*, Chateau de Bonas, France: Elsevier, pp. 215-226.

Data Differences Between Data Nexuses

Each deployment 101 of a nexus peering pair may begin a peering relationship 102 with different data to peer. A goal of nexus peering is to manage a consistent set of data across all peered deployments 101. To this end, nexus peering may automatically deconflict unambiguous concurrent changes to the same data objects 401 in each of a pair of peered data nexuses 301. In some embodiments, concurrent changes to the same data object 401 are detected as unambiguous when the changes are identical. However, it is not necessary that concurrenct changes be identical to be unambiguous. In some embodiments, a value-equals comparison is performed to determine whether concurrent changes are identical.

As described in greater detail below, concurrent changes to the same data object 401 that are detected as ambiguous may appear in the pending changes application. End-users may use the pending changes application to evaluate and accept or reject pending changes that appear in the pending changes application. In some embodiments, before pending changes are accepted, the pending changes are not stored in the data repository portion of the database 202.

Automatically Accepting Unambiguous Changes

An example of automatically accepting unambiguous changes will now be described with reference to the peering network 100 of FIG. 1 and Table 1 below. Assume, for purposes of this example, that deployment 101G and deployment 101A each store the same data object 401 in the data repository portion of their respective databases 202. Thereafter, an end-user at deployment 101G makes ten changes to the data object 401 stored at deployment 101G and an end-user at deployment 101A makes five changes to the data object 401 stored at deployment 101A. Thereafter, the data nexus 301 at deployment 101G and deployment 101A peer with each other. As a result, both deployment 101G and deployment 101A store the same data object 401 with the same vector clock values as indicated at Time 1 in the Table 1 below:

For example, automatic merging of concurrent changes may occur when the order of making the concurrent changes does not matter. For example, if end-users at multiple deployments 101 add different properties 402 to the same data

TABLE 1

Automatically Accepting Unambiguous Changes Example

| Time | Event | Deployment 101G's Vector Clock for the Data Object | Deployment 101A's Vector Clock for the Data Object |
|---|---|---|---|
| Time 1 | A data object stored at deployment 101G is at version 10 and the same data object stored at deployment 101A is at version 5. | 101G → 10, 101A → 5 | 101G → 10, 101A → 5 |
| Time 2 | End-user at deployment 101G changes the data object stored at deployment 101G from type "Person" to type "Employee". As a result, the vector clock for the data object at deployment 101G is incremented. | 101G → 11, (updated) 101A → 5 | 101G → 10, 101A → 5 |
| Time 3 | Deployments 101G and 101A peer with each other. As a result, deployment 101G's updated vector clock for the data object is sent to deployment 101A. | 101G → 11, 101A → 5 | 101G → 10, 101A → 5 |
| Time 4 | Since the vector clock for the data object at deployment 101A is less than the updated vector clock for the data object at deployment 101G, deployment 101A detects the change at Time 2 as unambiguous and automatically accepts and applies the change at deployment 101A. The vector clock at deployment 101A is also updated. | 101G → 11, 101A → 5 | 101G → 11, (updated) 101A → 5 |

The events at Times 1, 2, 3, and 4 represent unambiguous changes to the data object. As a result, the changes do not appear as pending changes in the pending changes application at either deployment 101G or deployment 101A.

Automatically Merging Unambiguous Concurrent Changes

In the previous example there were no concurrent changes. However, as mentioned previously, concurrent changes to the same data object can happen between peering intervals. In some embodiments, based on the type of changes, and where the changes are made, concurrent changes are automatically merged in a multi-step fashion.

object 401, the order in which the properties 402 are added does not matter. For example, a new "Phone Number" property that is added concurrently to a data object with a new "Address" property added to the data object can be automatically merged.

The following events listed in Table 2 below, which start from the same vector clocks of (deployment) 101G→10, 101A→5 as shown in the previous example, result in concurrent changes. However, since the concurrent changes are automatically merged, no pending changes result at either deployment 101G or deployment 101A.

TABLE 2

Automatically Merging Unambiguous Concurrent Changes Example

| Time | Event | Deployment 101G's Vector Clock for the Data Object | Deployment 101A's Vector Clock for the Data Object |
|---|---|---|---|
| Time 1 | A data object stored at deployment 101G is at version 10 and the same data object stored deployment 101A is at version 5. | Deployment 101G → 10, 101A → 5 | 101G → 10, 101A → 5 |
| Time 2 | End-user at deployment 101G changes the data object stored at deployment 101G from type "Person" to type "Employee". As a result, the vector clock for the data object at deployment 101G is incremented. | 101G → 11, (updated) 101A → 5 | 101G → 10, 101A → 5 |
| Time 3 | End-user at deployment 101A adds a new phone number property to the data object | 101G → 11, (updated) 101A → 5 | 101G → 10, 101A → 6 (updated) |

TABLE 2-continued

Automatically Merging Unambiguous Concurrent Changes Example

| Time | Event | Deployment 101G's Vector Clock for the Data Object | Deployment 101A's Vector Clock for the Data Object |
|---|---|---|---|
|  | stored at deployment 101A. As a result, the vector clock for the data object at deployment 101A is incremented. |  |  |
| Time 4 | Deployments 101G and 101A peer with each other. The vector clocks are not equal. | 101G → 11, 101A → 5 | 101G → 10, 101A → 6 |
| Time 5 | At deployment 101A, the concurrent changes to different properties of the data object are automatically merged. As a result, the vector clock for data object at deployment 101A is updated. | 101G → 11, 101A → 5 | 101G → 11, (updated) 101A → 7 (updated) |
| Time 6 | Deployment 101G receives deployment 101A's updated vector clock and compares the current changes. | 101G → 11, 101A → 5 | 101G → 11, 101A → 7 |
| Time 7 | Since deployment 101G's vector clock for the data object is less than deployment 101A's updated vector clock for the data object, the concurrent changes are automatically accepted at deployment 101G. Deployment 101G's version vector for the data object is updated as a result. | 101G → 11, 101A → 7 (updated) | 101G → 11, 101A → 7 |

Ambiguous Concurrent Changes

Ambiguous concurrent changes to the same data object can also happen between peering intervals. As explained in greater detail below, examples of possible types of ambiguous concurrent changes include date range, location, deletion, photo, resolution, title (name), and object type updates to a data object. When concurrent changes ambiguously conflict, the changes are pending until an end-user deconflicts the ambiguous changes by using the pending changes application as described in greater detail below.

TABLE 3

Ambiguous Conflicting Changes Example

| Time | Event | Deployment 101G's Vector Clock for the Data Object | Deployment 101A's Vector Clock for the Data Object |
|---|---|---|---|
| Time 1 | A data object stored at deployment 101G is at version 10 and the same data object stored deployment 101A is at version 5. | Deployment 101G → 10, 101A → 5 | 101G → 10, 101A → 5 |
| Time 2 | End-user at deployment 101G changes the data object stored at deployment 101G from type "Person" to type "Employee". As a result, the vector clock for the data object at deployment 101G is incremented. | 101G → 11, (updated) 101A → 5 | 101G → 10, 101A → 5 |
| Time 3 | End-user at deployment 101A changes the data object stored at deployment 101A from type "Person" to type "Contractor". As a result, the vector clock for the data object at deployment 101A is incremented. | 101G → 11, (updated) 101A → 5 | 101G → 10, 101A → 6 (updated) |
| Time 4 | Deployments 101G and 101A peer with each other. | 101G → 11, 101A → 5 | 101G → 10, 101A → 6 |
| Time 5 | Since the data object cannot have two types, the concurrent changes conflict and are designated as pending changes at both deployments. | 101G → 11, 101A → 5 (pending) | 101G → 10, (pending) 101A → 7 |

Value-Equals Comparisons

In some embodiments, value-equals comparisons are used to detect changes to data objects 401 and their properties 402, links 403, media 405, and notes 404. For data nexus peering, the value-equals comparison may be used to detect concurrent changes that are identical and thus do not conflict even though they are concurrent. In other words, a value-equals comparison may be performed to detect concurrent changes that are identical and thus unambiguous.

For example, if a "Person" type data object 401 stored at deployment 101G has an "Age" property 402 reset to 25 from another value, the new value of 25 may be compared to the value of the Age property 402 of the data object 401 stored at deployment 101A when peering with deployment 101A. If the value of the Age property 402 of the data object 401 stored at deployment 101A is also 25, then the value-equals comparison is satisfied. On the other hand, if the value of the Age property 402 of the data object 401 stored at deployment 101A is a different value (e.g., 27), then the values are not equal.

Evaluating Unresolved Ambiguous Data Conflicts

As mentioned previously, data conflicts can occur when concurrent, non-matching changes are made to the same data object at both deployments in a peering relationship. A deployment may peer its data nexus with multiple other deployments. The deployment may have a different set of unresolved ambiguous data conflicts with each of the multiple deployments it peers with.

Figure 5:
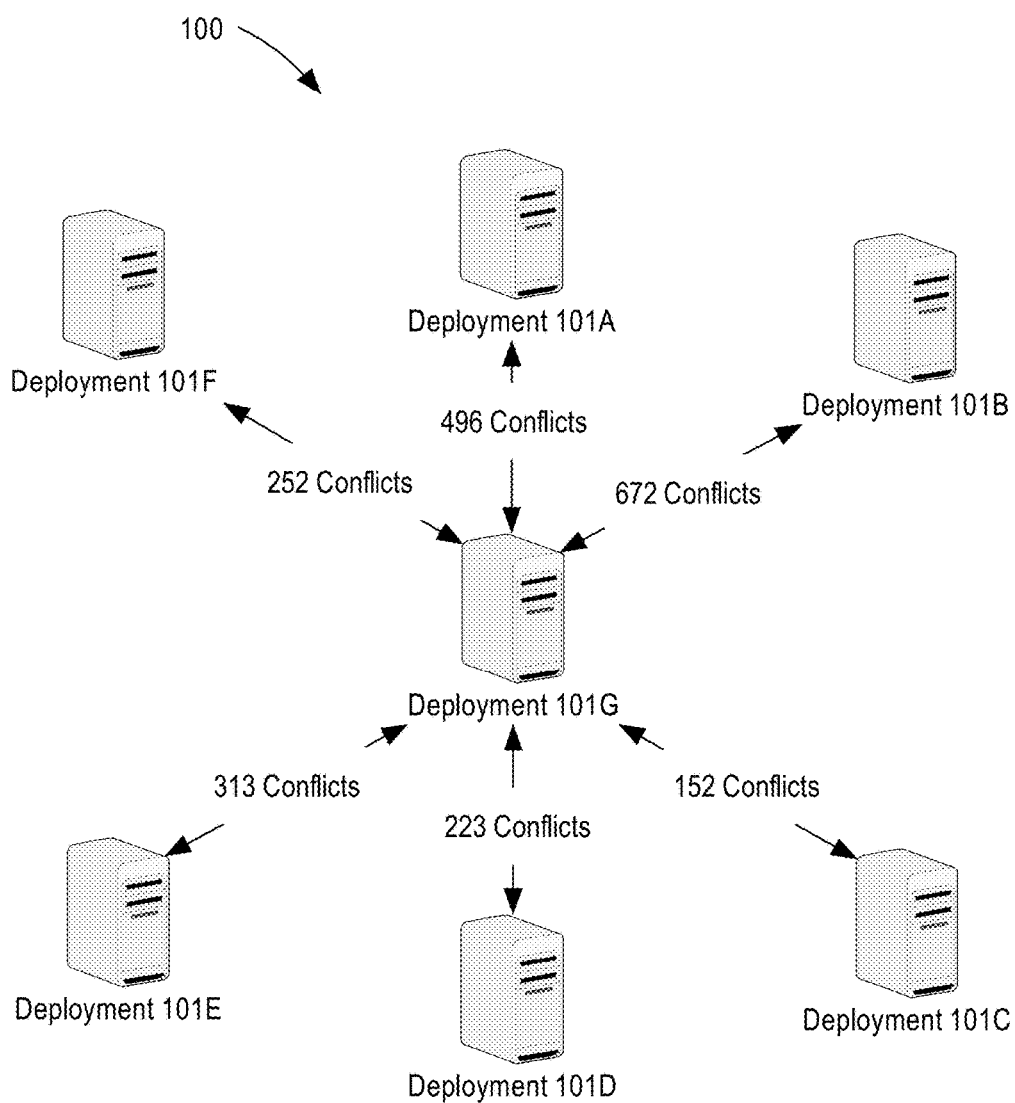
FIG. 5 illustrates an example peering network with data conflicts in which some embodiments of the present invention may be implemented.

For example, referring now to FIG. 5, it illustrates example peering network 100 of FIG. 1 but with unresolved ambiguous data conflicts as indicated in FIG. 5. In particular, deployment 101G has two-way peering relationships with six other deployments 101A, 101B, 101C, 101D, 101E, and 101F. Each peering relationship has a different number of unresolved ambiguous data conflicts as indicated in FIG. 5.

In accordance with some embodiments, data objects 401 at a deployment 101 involved in an unresolved ambiguous data conflict with a peer deployment 101 are not available in the deployment 101's data repository portion of the database 202 until the data conflict is resolved by an end-user using the pending changes application.

While some data conflicts may be automatically deconflicted during the data nexus peering process, data conflicts that cannot be automatically deconflicted appear in the pending changes application until an end-user manually evaluates and resolves the data conflicts. In some embodiments, once an ambiguous data conflict is resolved using the pending change application, the data objects 401 involved in the data conflict appear in the data repository portion of the database 202 at the deployment 101.

Ambiguous Data Conflict Types

In some embodiments, there are different types of ambiguous data conflicts that appear in the pending changes application. The following table summarizes some possible different types of ambiguous data conflicts:

TABLE 4

Example Types of Ambiguous Data Conflicts

| Type | Brief Description |
| --- | --- |
| Object Type | Occurs when concurrent, non-matching edits to the same data object's type are made at peered deployments. |
| Title | Occurs when concurrent, non-matching changes to the same data object's title are made at peered deployments. |
| Photo | Occurs when concurrent, non-matching changes to the same data object's photo are made at peered deployments. |
| Deletion | Occurs when a data object is concurrently deleted at one deployment and modified, but not deleted, at a peer deployment. |
| Geotime | Occurs when concurrent, non-matching changes to the Date Range and Location property of the same object are made at peered deployments. |
| Resolution | Occurs when multiple data objects are resolved or merged differently at peered deployments. |

Each of these different types of ambiguous data conflicts is described in greater detail hereinafter. In some instances, an ambiguous data conflict type has a number of data conflict sub-types. For example, in some embodiments, there are nine sub-types of the geotime data conflict type.

Object Type Data Conflicts

An object type data conflict can occur when the type of a data object 401 is changed at one deployment 101 and a concurrent, non-matching change to the type of the same data object is made at a peer deployment 101. For example, an end-user at deployment 101A may change the object type of a database object 401 from "Restaurant" to "Business" while another end-user may concurrently change the object type of the database object 401 at peer deployment 101G from "Restaurant" to "Fast Food". If the data conflict is not resolved automatically, then the data conflict is ambiguous. In some embodiments, the object type of a data object 401 is a property 402 of the data object 401.

Figure 6:
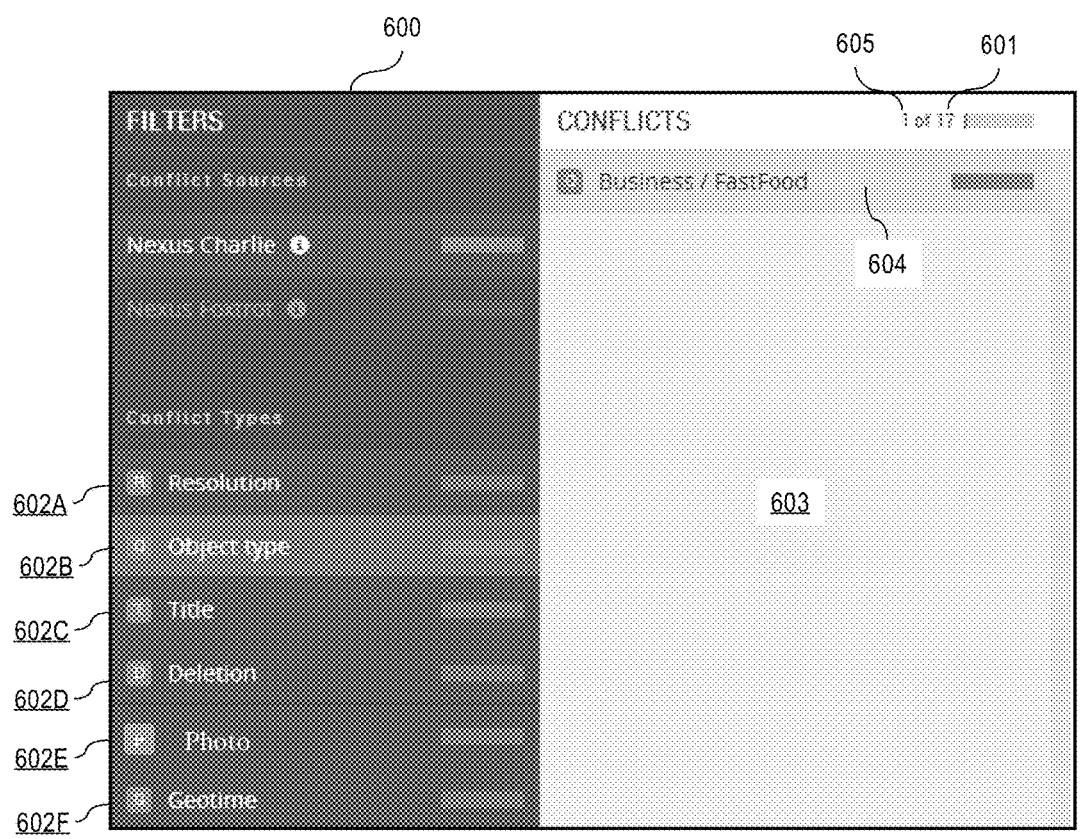
FIG. 6 illustrates an example graphical user interface for filtering data conflicts by data conflict type according to some embodiments of the present invention.

Turning now to FIG. 6, it is an example graphical user interface (GUI) 600 that may be presented to an end-user by the pending changes application executing at a "local" deployment 101 that has a peering relationship 102 with a "peer" deployment 101. In this example, the local deployment 101 is named "Nexus Charlie" and the peer deployment 101 is named "Nexus Foxtrot". These names are arbitrary and other names could be used.

GUI 600 allows the end-user to view the currently unresolved ambiguous data conflicts between the local deployment 101 and the peer deployment 101 by a selected data conflict type. In this example, there are 17 total currently unresolved ambiguous data conflicts between the local deployment 101 "Nexus Charlie" and the peer deployment 101 "Nexus Foxtrot" as indicated by total number of unresolved ambiguous data conflicts indicator 601.

GUI 600 also includes a number of selectable data conflict type filters 602 that filter which of the total number of unresolved ambiguous data conflicts are listed in conflict panel area 603 of the GUI 600. In this example, the object type filter 602B is selected. This selection may be made by the end-user using any suitable user input technique such as, for example, by using a pointing device (e.g., a mouse) or with a touch gesture on a touch sensitive surface (e.g., a touch screen display).

As a result of selecting object type filter 602B, the one currently unresolved ambiguous data conflict of the 17 total unresolved ambiguous data conflicts that is an object type data conflict is listed 604 in conflict panel area 603. In this particular example, only 1 of the 17 total unresolved ambiguous data conflicts is an object type data conflict as indicated by the number of currently selected unresolved ambiguous data conflicts indicator 605. However, more or less than 1 of the 17 unresolved ambiguous data conflicts could just as easily be object type data conflicts.

In some embodiments, object type data conflicts are listed in the conflict panel area 603 in the following format:

[object type at local deployment]/[object type at peer deployment].

For example, object type data conflict listing 604 indicates that there is an unresolved ambiguous data conflict for a data object 401 at Nexus Charlie in which the object type of the data object 401 at Nexus Charlie is "Business" and the object type of the data object 401 at Nexus Foxtrot is "FastFood".

Title Conflicts

A title conflict can occur when the title of a data object 401 is changed at a local deployment 101 and a concurrent, non-matching change to the title of the data object 401 is made at a peer deployment 101. For example, an end-user at deployment 101G may change the title of a "BBQ Restaurant" type data object 401 to "Ray's BBQ" and another end-user at deployment 101A may change the title of the same data object 401 to "Ray's Ribs". If the data conflict is not resolved automatically, then the data conflict is ambiguous. In some embodiments, the title of a data object 401 is a property 402 of the data object 401.

In accordance with some embodiments, if concurrent changes to a data object's 401 title at peered deployments 101 do not match, the title conflict appears in the pending changes application after a subsequent peering event between the two peered deployments 101.

In accordance with some embodiments, a title conflict belongs to one of the title conflict categories:

TABLE 5

Title Conflict Categories

| Category | Brief Description |
| --- | --- |
| Case difference | An object's title is in a different case than the same object on a peered deployment. |
| Punctuation difference | An object's title contains different punctuation than the same objet on a peered deployment. |
| Punctuation and case difference | An object's title contains both different punctuation and case than the same object on a peered deployment. |
| Dissimilar titles | All title conflicts that are not covered by the preceding categories. |

Figure 7:
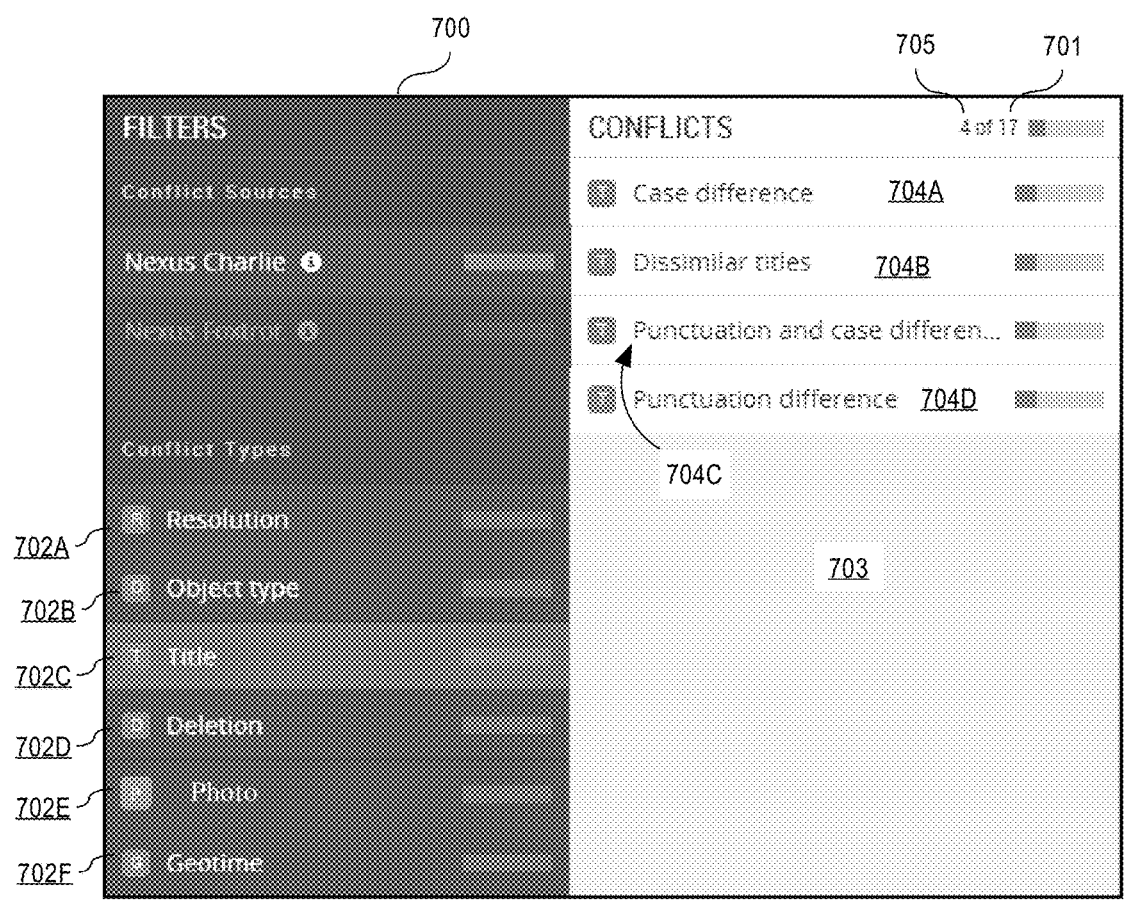
FIG. 7 illustrates another example graphical user interface for filtering data conflicts by data conflict type according to some embodiments of the present invention.

Turning now to FIG. 7, it is an example graphical user interface (GUI) 700 that may be presented to an end-user by the pending changes application executing at a "local" deployment 101 that has a peering relationship 102 with a "peer" deployment 101. In this example as with the previous example, the local deployment 101 is named "Nexus Charlie" and the peer deployment 101 is named "Nexus Foxtrot". These names are arbitrary and other names could be used.

GUI 700 allows the end-user to view the currently unresolved ambiguous data conflicts between the local deployment 101 and the peer deployment 101 by a selected data conflict type. In this example, there are 17 total unresolved ambiguous data conflicts between the local deployment 101 "Nexus Charlie" and the peer deployment 101 "Nexus Foxtrot" as indicated by total number of unresolved ambiguous data conflicts indicator 701.

GUI 700 also includes a number of selectable data conflict type filters 702 that filter which of the total number of unresolved ambiguous data conflicts are listed in conflict panel area 703 of the GUI 700. In this example, the object type filter 702C is selected. This selection may be made by the end-user using any suitable user input technique such as, for example, by using a pointing device (e.g., a mouse) or with a touch gesture on a touch sensitive surface (e.g., a touch screen display).

As a result of selecting object type filter 702C, four currently unresolved ambiguous data conflicts of the 17 total unresolved ambiguous data conflicts that are title type data conflicts are listed 704 in conflict panel area 703. In this particular example, only 4 of the 17 total unresolved ambiguous data conflicts are title type data conflicts as indicated by the number of currently selected unresolved ambiguous data conflicts indicator 705. However, more or less than 4 of the 17 unresolved ambiguous data conflicts could just as easily be title type data conflicts.

In some embodiments, a title type data conflict is listed in the conflict panel area 703 with an indication of the title data conflict category of the title type data conflict. For example, title type data conflict listing 704A indicates that there is a pending unresolved title type data conflict for a data object 401 at Nexus Charlie in which title of the data object 401 at Nexus Charlie is in a different case than the title for the data object 401 at Nexus Foxtrot. As another example, title type data conflict listing 704B indicates that there is another pending unresolved title type data conflict for a data object 401 at Nexus Charlie in which title of the data object 401 at Nexus Charlie is dissimilar from the title for the data object 401 at Nexus Foxtrot. Here, dissimilar means that the titles are different from each other in ways other than just case and/or punctuation. As another example, title type data conflict listing 704C indicates that there is a pending unresolved title type data conflict for a data object 401 at Nexus Charlie in which title of the data object 401 at Nexus Charlie has both case and punctuation differences from the title for the data object 401 at Nexus Foxtrot. As yet another example, title type data conflict listing 704D indicates that there is a pending unresolved title type data conflict for a data object 401 at Nexus Charlie in which title of the data object 401 at Nexus Charlie has a punctuation difference from the title for the data object 401 at Nexus Foxtrot.

Photo Conflicts

A photo conflict can occur when the photo of a data object 401 is changed at a local deployment 101 and a concurrent, non-matching change to the photo of the data object 401 is made at a peer deployment 101. For example, an end-user at deployment 101G may update the photo of a person type data object 401 with a recent photo of the person and another end-user at deployment 101A may change the photo of the same person data object 401 with a different photo. If the data conflict is not resolved automatically, then the data conflict is ambiguous. In some embodiments, the photo of a data object 401 is a property 402 or a media 405 of the data object 401.

Figure 8:
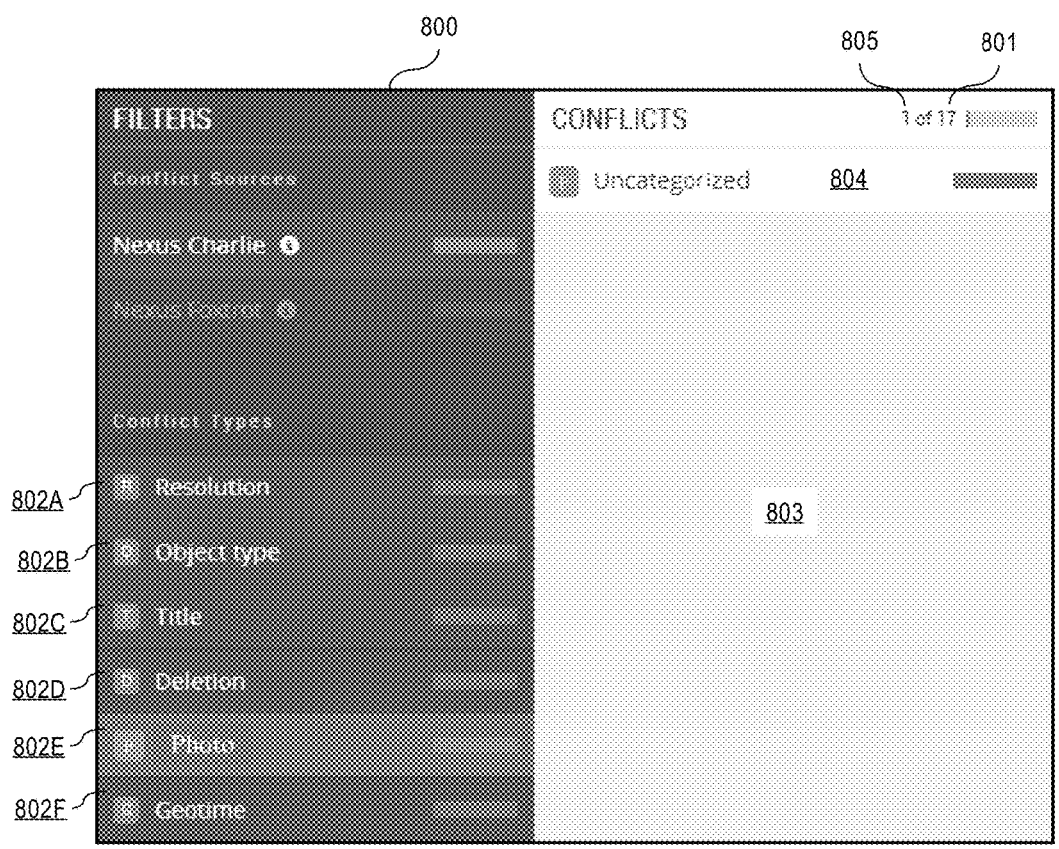
FIG. 8 illustrates yet another example graphical user interface for filtering data conflicts by data conflict type according to some embodiments of the present invention.

Turning now to FIG. 8, it is an example graphical user interface (GUI) 800 that may be presented to an end-user by the pending changes application executing at a "local" deployment 101 that has a peering relationship 102 with a "peer" deployment 101. In this example as with the previous example, the local deployment 101 is named "Nexus Charlie" and the peer deployment 101 is named "Nexus Foxtrot". These names are arbitrary and other names could be used.

GUI 800 allows the end-user to view the currently unresolved ambiguous data conflicts between the local deployment 101 and the peer deployment 101 by a selected data conflict type. In this example, there are 17 total unresolved ambiguous data conflicts between the local deployment 101

"Nexus Charlie" and the peer deployment 101 "Nexus Foxtrot" as indicated by total number of unresolved ambiguous data conflicts indicator 801.

GUI 800 also includes a number of selectable data conflict type filters 802 that filter which of the total number of unresolved ambiguous data conflicts are listed in conflict panel area 803 of the GUI 800. In this example, the object type filter 802D is selected. This selection may be made by the end-user using any suitable user input technique such as, for example, by using a pointing device (e.g., a mouse) or with a touch gesture on a touch sensitive surface (e.g., a touch screen display).

As a result of selecting object type filter 802D, one currently unresolved ambiguous data conflict of the 17 total unresolved ambiguous data conflicts that is a photo type data conflict is listed 804 in conflict panel area 803. In this particular example, only 1 of the 17 total unresolved ambiguous data conflicts is a photo type data conflict as indicated by the number of currently selected unresolved ambiguous data conflicts indicator 805. However, more or less than 1 of the 17 unresolved ambiguous data conflicts could just as easily be title type data conflicts.

In some embodiments, the information presented on a photo type data conflict listing such listing 804 of GUI 800 is the text "Uncategorized" to indicate that the underlying photo type data conflict is not categorized into a photo type data conflict sub-category or that no sub-categories for the photo type data conflict exist. However, the information presented on photo type data conflict list 804 may be other text or other information. For example, thumbnail images of the conflicting photos may be presented on listing 804.

Deletion Conflicts

A deletion conflict can occur when a data object 401 is changed at a local deployment 101 and the data object 401 is concurrently deleted at a peer deployment 101. For example, an end-user at deployment 101G may update the photo of a person type data object 401 and another end-user at deployment 101A may delete the same person data object 401. If the data conflict is not resolved automatically, then the data conflict is ambiguous.

Figure 9:
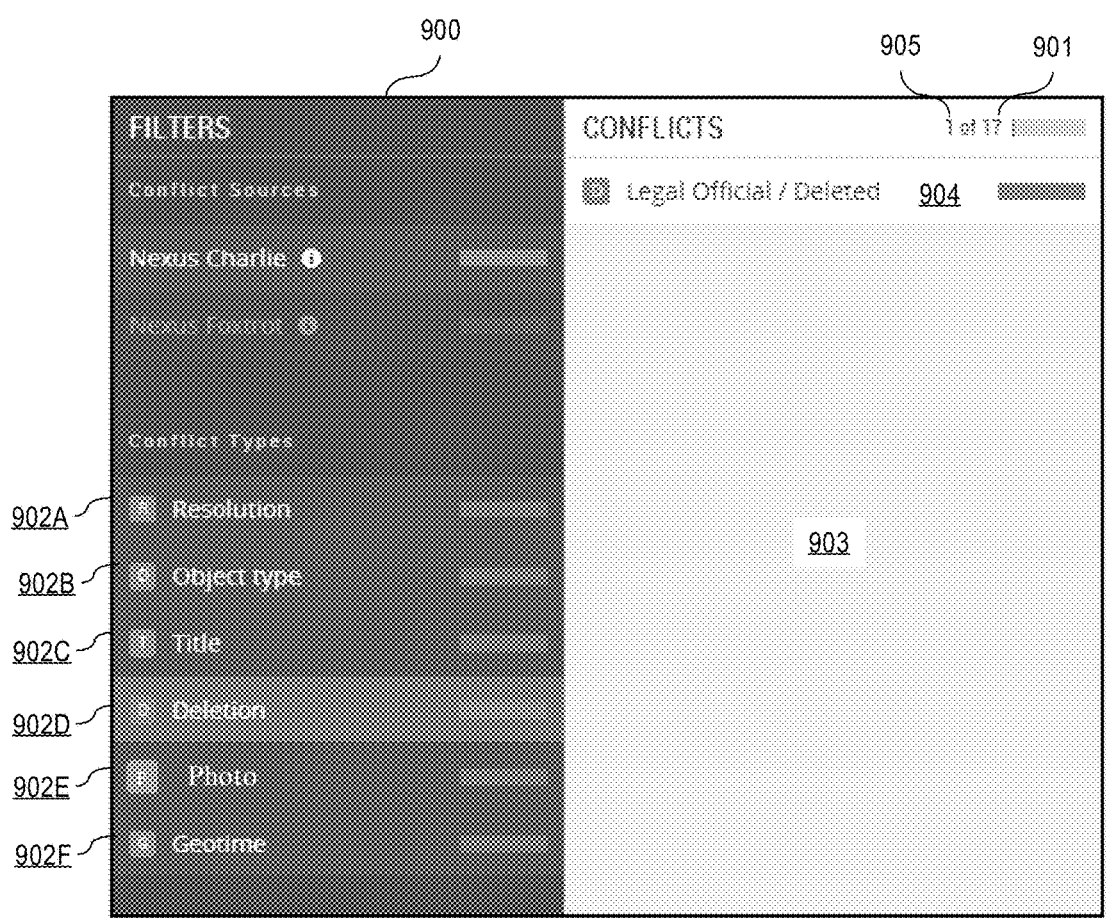
FIG. 9 illustrates yet another example graphical user interface for filtering data conflicts by data conflict type according to some embodiments of the present invention.

Turning now to FIG. 9, it is an example graphical user interface (GUI) 900 that may be presented to an end-user by the pending changes application executing at a "local" deployment 101 that has a peering relationship 102 with a "peer" deployment 101. In this example as with the previous examples, the local deployment 101 is named "Nexus Charlie" and the peer deployment 101 is named "Nexus Foxtrot". These names are arbitrary and other names could be used.

GUI 900 allows the end-user to view the currently unresolved ambiguous data conflicts between the local deployment 101 and the peer deployment 101 by a selected data conflict type. In this example, there are 17 total unresolved ambiguous data conflicts between the local deployment 101 "Nexus Charlie" and the peer deployment 101 "Nexus Foxtrot" as indicated by total number of unresolved ambiguous data conflicts indicator 901.

GUI 900 also includes a number of selectable data conflict type filters 902 that filter which of the total number of unresolved ambiguous data conflicts are listed in conflict panel area 903 of the GUI 900. In this example, the object type filter 902D is selected. This selection may be made by the end-user using any suitable user input technique such as, for example, by using a pointing device (e.g., a mouse) or with a touch gesture on a touch sensitive surface (e.g., a touch screen display).

As a result of selecting object type filter 902D, one currently unresolved ambiguous data conflict of the 17 total unresolved ambiguous data conflicts that is a deletion type data conflict is listed 904 in conflict panel area 903. In this particular example, only 1 of the 17 total unresolved ambiguous data conflicts is a deletion type data conflict as indicated by the number of currently selected unresolved ambiguous data conflicts indicator 905. However, more or less than 1 of the 17 unresolved ambiguous data conflicts could just as easily be deletion type data conflicts.

In some embodiments, the information presented on a deletion type data conflict listing such listing 904 of GUI 800 is in the form:

[Type of the data object at local deployment/Deleted]

For example, deletion type data conflict listing 904 indicates that there is an unresolved ambiguous data conflict for a data object 401 at Nexus Charlie in which the object type of the data object 401 at Nexus Charlie is "Legal Official" and the same data object 401 at Nexus Foxtrot is deleted.

Geotime Conflicts

A geotime conflict can occur when a date range and location property 402 of a data object 401 is changed at a local deployment 101 and a concurrent, non-matching change to the same data range and location property 402 of the same data object 401 is made at a peer deployment 101. For example, an end-user at deployment 101G may modify the start and end times for an event type data object 401 and another end-user at deployment 101A may modify the start and ends times for the same event type data object 401 differently. If the data conflict is not resolved automatically, then the data conflict is ambiguous. In some embodiments, the start time, the end time, and the geo-location of an event type data object 401 are each a property 402 of the data object 401. However, the start time, the end, and the geo-location of the event could be combined into fewer than three properties 402 of the data object 401 or spread over more than three properties 402 of the data object 401. As one example, a geo-location of an event data object 401 could be specified by three properties 402, one for latitude, one for longitude, and one for elevation.

In accordance with some embodiments, a geotime conflict belongs to one of the following geotime conflict categories:

TABLE 6

Geotime Conflict Categories

| Category | Brief Description |
| --- | --- |
| Dissimilar geotime information | An event type data object 401 has different time and location properties 402 on peered deployments 101. |
| Geographic location difference | An event type data object 401 has different location properties 402 on peered deployments 101. |
| Geographic data map difference | An event type data object 401 has a different data maps on peered deployments 101. A geotime conflict can be in this category when geographic coordinates (e.g., military grid reference system (MGRS) coordinates) have different data sources 407 at the peered deployments 101. |
| Elevation data difference | An event type data object 401 has a different elevation property 402 on peered deployments 101. |
| Time interval conflict | An event type data object 401 has different time intervals on peered deployments 101. |
| Ours: Multiple properties | A data object 401 at the local deployment 101 has multiple date and location properties 402, but the same data object 401 at a peer deployment 101 has only one date and location property 402. |
| Theirs: Multiple properties | A data object 401 at a peer deployment 101 has multiple date and location properties 402, but the same data object 401 at the local deployment 101 has only one date and location property 402. |

TABLE 6-continued

Geotime Conflict Categories

| Category | Brief Description |
|---|---|
| Both: Multiple properties | A data object 401 has multiple date and location properties 402 at both the local and peer deployments 101. |
| Time zone difference offset | A data object 401 has the same time on peered deployments 101 but with different time zone offsets. |

Figure 10:
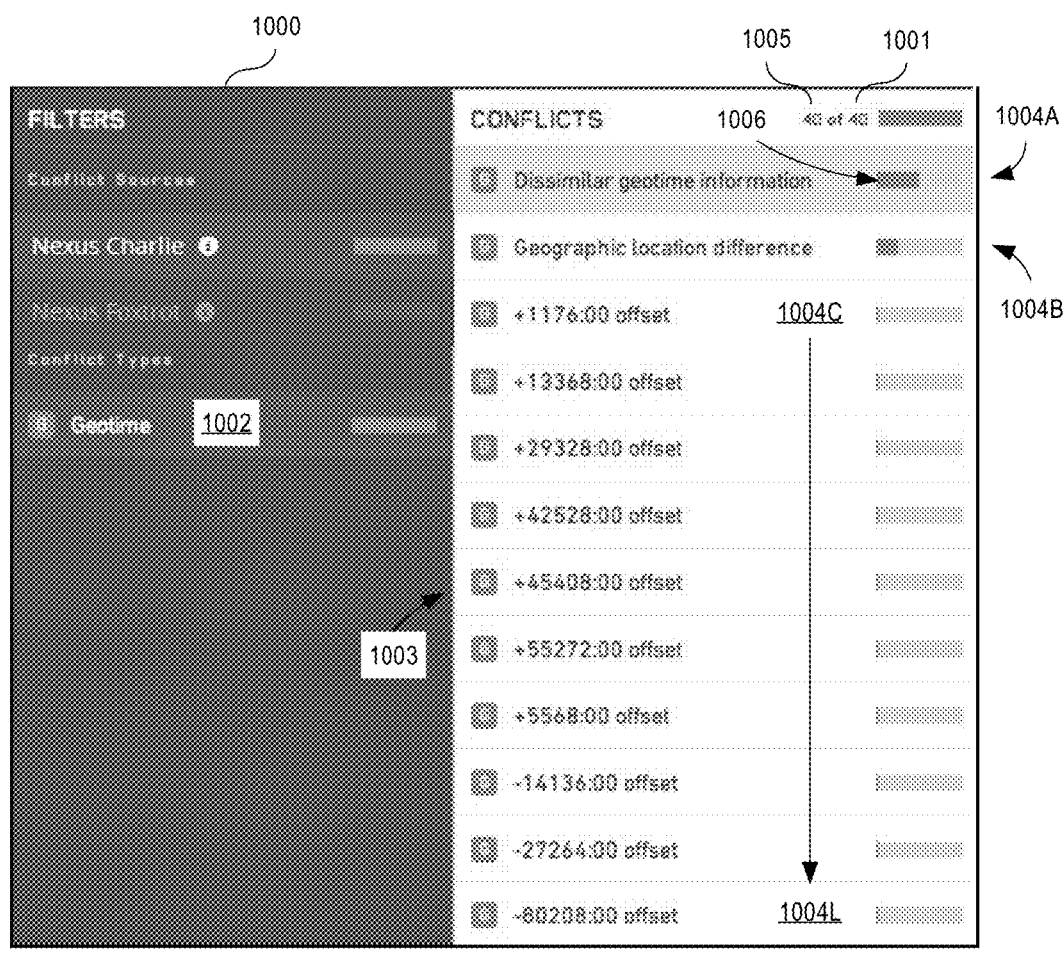
FIG. 10 illustrates yet another example graphical user interface for filtering data conflicts by data conflict type according to some embodiments of the present invention.

Turning now to FIG. 10, it is an example graphical user interface (GUI) 1000 that may be presented to an end-user by the pending changes application executing at a "local" deployment 101 that has a peering relationship 102 with a "peer" deployment 101. In this example as with the previous examples, the local deployment 101 is named "Nexus Charlie" and the peer deployment 101 is named "Nexus Foxtrot". These names are arbitrary and other names could be used.

GUI 1000 allows the end-user to view the currently unresolved ambiguous data conflicts between the local deployment 101 and the peer deployment 101 by a selected data conflict type. In this example, there are 40 total unresolved ambiguous data conflicts between the local deployment 101 "Nexus Charlie" and the peer deployment 101 "Nexus Foxtrot" as indicated by total number of unresolved ambiguous data conflicts indicator 1001.

GUI 1000 also includes a selectable data conflict type filter 1002 that filter which of the total number of unresolved ambiguous data conflicts are listed in conflict panel area 1003 of the GUI 1000. In this example, the geotime filter 1002 is selected. This selection may be made by the end-user using any suitable user input technique such as, for example, by using a pointing device (e.g., a mouse) or with a touch gesture on a touch sensitive surface (e.g., a touch screen display).

As a result of selecting geotime filter 1002, the forty (40) currently unresolved ambiguous geotime type data conflicts of the forty (40) total currently unresolved ambiguous data conflicts are listed 1004 in conflict panel area 1003. The GUI 1000 may include scroll bar controls (not shown) for scrolling through all of the listed data conflicts if all the listed data conflicts cannot be viewed at the same time in the visible area provided by panel 1003. In this particular example, all forty (40) of the total number of unresolved ambiguous data conflicts are geotime type data conflicts as indicated by the number of currently selected unresolved ambiguous data conflicts indicator 1005. However, less than forty (40) of the total number of unresolved ambiguous data conflicts could just as easily be geotime data conflicts.

In some embodiments, a data conflict listing in the conflict panel area represents more than one data conflict in the same category. For example, data conflict listing 1004A represents multiple geotime data conflicts in the dissimilar geotime information category. Flood bar 1006 indicates the percentage of the total number of currently selected data conflicts indicated by indicator 1005 (i.e., forty (40)) that are represented by data conflict listing 1004A.

In some embodiments, the geotime data conflict category of a geotime data conflict is indicated on the listing 1004 of the geotime data conflict in the conflict panel 1003. For example, listing 1004A indicates that the data conflicts represented by listing 1004A are in the dissimilar geotime information category, listing 1004B indicates that the data conflicts represented by listing 100B are in the geographic location difference category, and listings 1004C through 1004L indicate that the data conflicts represented by those listings 1004C-1004L are in the time zone difference offset category.

Resolution Conflicts

In some embodiments, a "resolution" change can be made to a data object 401. A resolution change is one where multiple data objects 401 that represent the same real-world object or thing are combined together or one where previously resolved data objects 401 are unresolved to separate them into the original component data objects 401. A resolution data conflict can occur when two or more data objects 401 are resolved differently at a local deployment 101 than as concurrently resolved at a peer deployment 101. For example, an end-user at deployment 101G may resolve a data object 401 with a name property 402 value of "Miss Williams" into another data object 401 with a name property 402 of "Mrs. Williams", but another end-user at deployment 101A may resolve the "Mrs. Williams" data object 401 into the "Miss Williams" data object 401. If the data conflict is not resolved automatically, then the data conflict is ambiguous.

Figure 11:
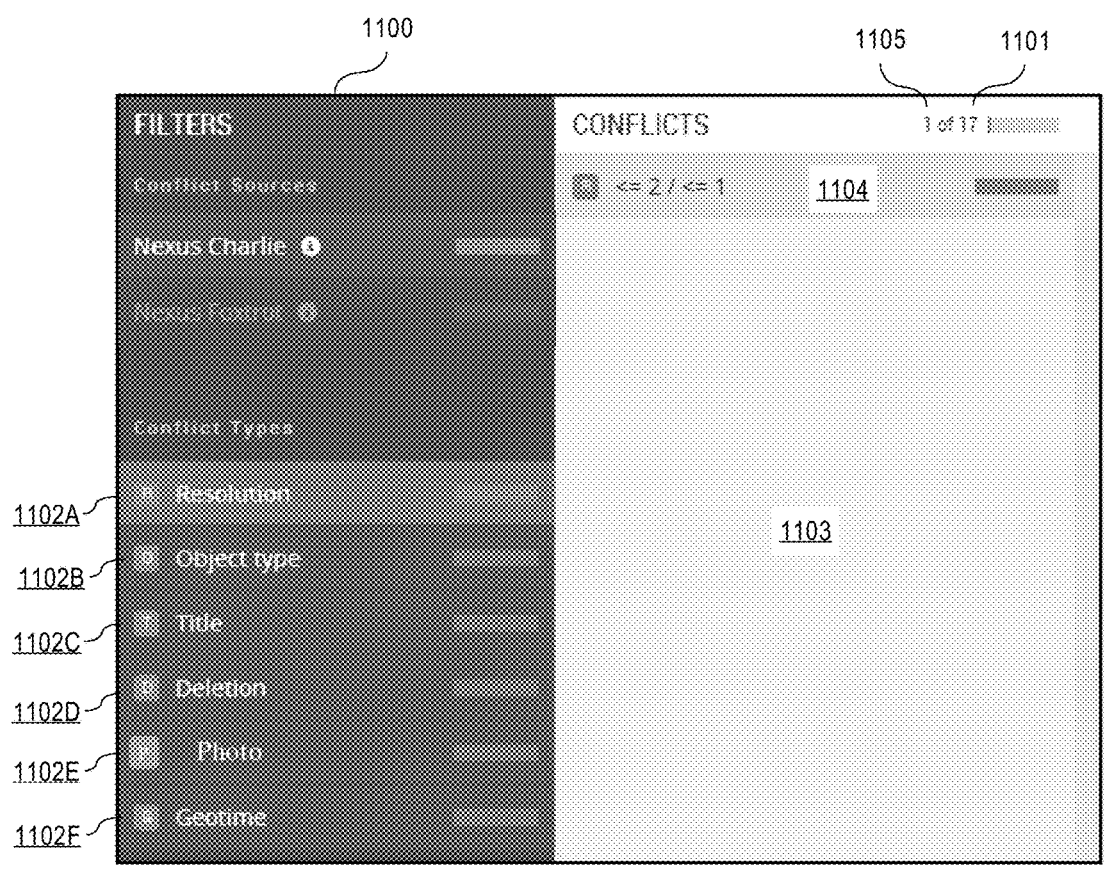
FIG. 11 illustrates yet another example graphical user interface for filtering data conflicts by data conflict type according to some embodiments of the present invention.

Turning now to FIG. 11, it is an example graphical user interface (GUI) 1100 that may be presented to an end-user by the pending changes application executing at a "local" deployment 101 that has a peering relationship 102 with a "peer" deployment 101. In this example as with the previous examples, the local deployment 101 is named "Nexus Charlie" and the peer deployment 101 is named "Nexus Foxtrot". These names are arbitrary and other names could be used.

GUI 1100 allows the end-user to view the currently unresolved ambiguous data conflicts between the local deployment 101 and the peer deployment 101 by a selected data conflict type. In this example, there are seventeen (17) total unresolved ambiguous data conflicts between the local deployment 101 "Nexus Charlie" and the peer deployment 101 "Nexus Foxtrot" as indicated by total number of unresolved ambiguous data conflicts indicator 1101.

GUI 1100 also includes a number of selectable data conflict type filters 1102 that filter which of the total number of unresolved ambiguous data conflicts are listed in conflict panel area 1103 of the GUI 1100. In this example, the resolution filter 1102A is selected. This selection may be made by the end-user using any suitable user input technique such as, for example, by using a pointing device (e.g., a mouse) or with a touch gesture on a touch sensitive surface (e.g., a touch screen display).

As a result of selecting object type filter 1102D, one currently unresolved ambiguous data conflict of the 17 total unresolved ambiguous data conflicts that is a resolution type data conflict is listed 1104 in conflict panel area 1103. In this particular example, only 1 of the 17 total unresolved ambiguous data conflicts is a resolution type data conflict as indicated by the number of currently selected unresolved ambiguous data conflicts indicator 1105. However, more or less than 1 of the 17 unresolved ambiguous data conflicts could just as easily be resolution type data conflicts.

In some embodiments, the information presented on a resolution type data conflict listing such listing 1104 of GUI 1100 is in the form:

[Number of data objects in conflict at local deployment/Number of data objects in conflict at peer deployment]

For example, listing 1104 indicates that the resolution data conflict represented by the listing 1104 involves two (2) data objects 401 at Nexus Charlie and one (1) data object 401 at Nexus Foxtrot.

Resolving Ambiguous Data Conflicts

In accordance with some embodiments, an end-user can resolve multiple data conflicts at the same time, rather than resolving them one at a time. For example, an end-user can resolve multiple data conflicts of a particular data conflict type at the same time as opposed to manually resolving one at a time. This is especially useful in situations where the end-user wishes to resolve multiple data conflicts in the same way.

Figure 12:
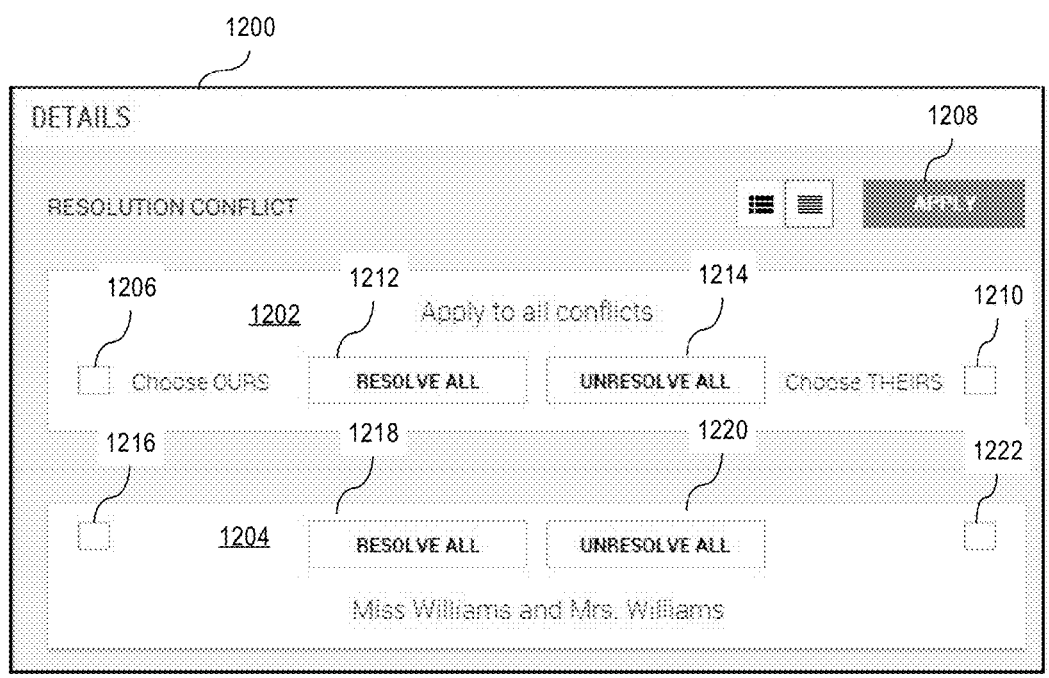
FIG. 12 illustrates an example graphical user interface for resolving data conflicts according to some embodiments of the present invention.

For example, FIG. 12 illustrates a possible graphical user interface (GUI) 1200 that may be presented by the pending changes application. GUI 1200 may be displayed in response to selecting a data conflict listing in the conflict panel area of the filter GUI. For example, GUI 1200 may be displayed in response to selecting data conflict listing 1104 in GUI 1100 of FIG. 11.

GUI 1200 provides details about one or more selected data conflicts of a particular type, in this example the resolution data conflict type. GUI 1200 includes at least two panels 1202 and 1204. Panel 1202 includes controls for resolving all selected data conflicts in the same way. Panel 1204 lists one of the selected data conflicts individually and includes controls for resolving that selected data conflict individually. In this example, there is only one selected data conflict of the resolution data conflict type. If there were more than one selected data conflict, then multiple panels like panel 1204 could be displayed in GUI 1200, one panel 1204 for each of the multiple selected data conflicts.

In some embodiments, an end-user can resolve all of multiple selected data conflicts such that the versions of data involved in the data conflicts at the local deployment 101 are accepted as the correct versions at the local deployment 101. For example, an end-user could select checkbox 1206 and then the "Apply" button 1208 to resolve all of the selected resolution data conflicts such that the versions of the data involved in the data conflicts at the local deployment 101 are accepted as the correct versions at the local deployment 101.

In some embodiments, an end-user can resolve all of multiple selected data conflicts such that the versions of data involved in the data conflicts at the peer deployment 101 are accepted as the correct versions at the local deployment 101. For example, an end-user could select checkbox 1210 and then the "Apply" button 1208 to resolve all of the selected resolution data conflicts such that the versions of the data involved in the data conflicts at the peer deployment 101 are accepted as the correct versions at the local deployment 101.

Panel 1202 also include a "resolve all" button 1212 which, if selected (possibly in conjunction with the apply button 1208), resolves each of the selected resolution data conflicts such that, for each such data conflict, all data objects 401 involved in the conflict at both the local deployment and the peer deployment are resolved together.

Panel 1202 also include an "unresolve all" button 1214 which, if selected (possibly in conjunction with the apply button 1208), unresolves each of the selected resolution data conflicts such that, for each such data conflict, all data objects 401 involved in the conflict at both the local deployment and the peer deployment are unresolved into separate data objects 401.

Panel 1204 includes user interface controls 1216, 1218, 1220, and 1222 that correspond to user interface controls 1206, 1212, 1214, and 1210 respectively for performing actions on the individual resolution data conflict represented by panel 1204.

Figure 13:
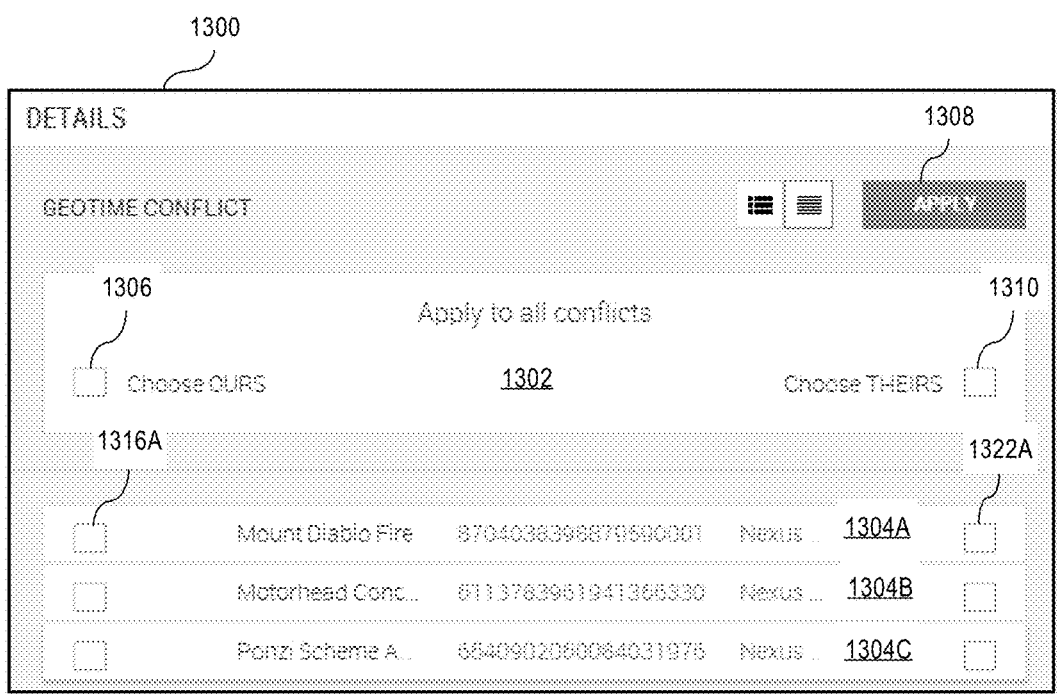
FIG. 13 illustrates an example graphical user interface for resolving data conflicts in categories according to some embodiments of the present invention.

For example, FIG. 13 illustrates another possible graphical user interface (GUI) 1300 that may be presented by the pending changes application. GUI 1300 may be displayed in response to selecting a data conflict listing in the conflict panel area of the filter GUI. For example, GUI 1300 may be displayed in response to selecting data conflict listing 1004A in GUI 1000 of FIG. 10.

Similar to GUI 1200 of FIG. 12, GUI 1300 provides details about one or more selected data conflicts of a particular type, in this example the geotime data conflict type. GUI 1300 includes panel 1302 and panels 1304A, 1304B, and 130C. Panel 1302 includes controls for resolving all selected data conflicts in the same way. Each panel 1304 lists one of the selected data conflicts individually and includes controls for resolving that selected data conflict individually. In this example, there is only three selected data conflict of the geotime data conflict type. If there were less than three or more three selected data conflict, then more or less panels 1304 could be displayed in GUI 1300, one panel 1204 for each of the multiple selected data conflicts.

In some embodiments, an end-user can resolve all of multiple selected data conflicts such that the versions of data involved in the data conflicts at the local deployment 101 are accepted as the correct versions at the local deployment 101. For example, an end-user could select checkbox 1306 and then the "Apply" button 1308 to resolve all of the selected geotime data conflicts such that the versions of the data involved in the data conflicts at the local deployment 101 are accepted as the correct versions at the local deployment 101.

In some embodiments, an end-user can resolve all of multiple selected data conflicts such that the versions of data involved in the data conflicts at the peer deployment 101 are accepted as the correct versions at the local deployment 101. For example, an end-user could select checkbox 1310 and then the "Apply" button 1308 to resolve all of the selected resolution data conflicts such that the versions of the data involved in the data conflicts at the peer deployment 101 are accepted as the correct versions at the local deployment 101.

Each panel 1304 also includes user interface controls that correspond to user interface for apply a conflict resolution actions on the individual resolution data conflict represented by panel 1304. For example, panel 1304A includes user interface controls 1316 and 1222 that correspond to user interface controls 1306 and 1310 respectively, but are for performing a conflict resolution action on the individual resolution data conflict represented by panel 1304A instead of on all selected data conflicts.

Computer-Based Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
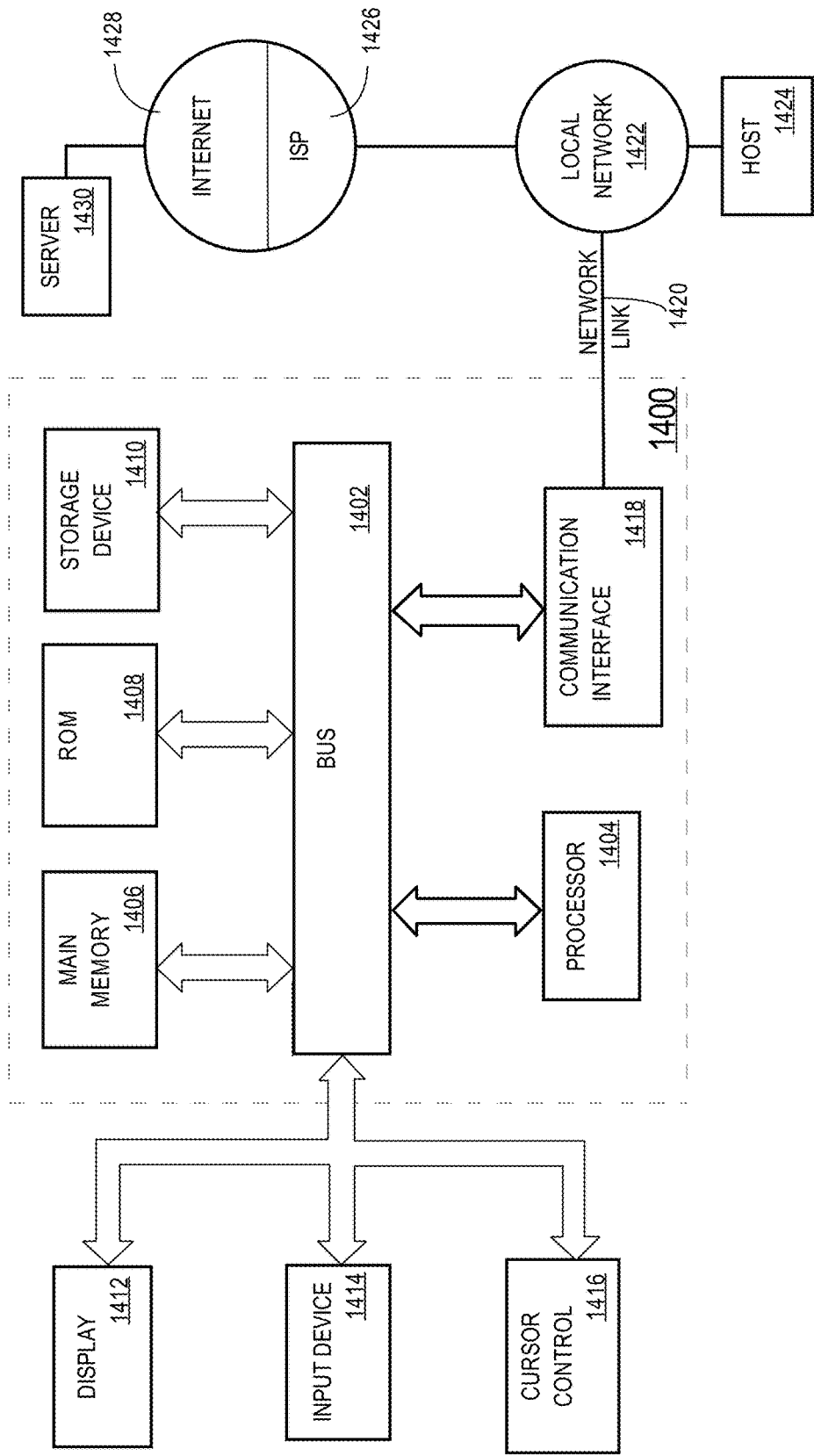
FIG. 14 is a block diagram of a computer system on which embodiments of the present invention may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing computer-executable instructions which, when executed by one or more processors in a peering network comprising a local deployment and a peer deployment, causes performance of a method for assisting a user in deconflicting concurrency conflicts, the method comprising:
    detecting a plurality of ambiguous data conflicts between the local deployment and the peer deployment;
    providing a graphical user interface comprising interactive controls for each of a plurality of predefined data conflict types;
    wherein the interactive controls for each predefined data conflict type of the plurality of predefined data conflict types is for filtering the plurality of ambiguous data conflicts by that each predefined data conflict type;
    responsive to receiving a selection of a particular predefined data conflict type of the plurality of predefined data conflict types, providing a graphical user interface comprising a listing of interactive list items, each interactive list item of the interactive list items representing (a) a different sub-data conflict type of the particular predefined data conflict type, and (b) one or more corresponding ambiguous data conflicts, of the plurality of ambiguous data conflicts, that are of the different sub-data conflict type, of the particular predefined data conflict type, represented by the each interactive list item; and
    responsive to receiving a selection of a particular interactive list item of the interactive list items, providing a graphical user interface that allows a user to resolve one or more of the one or more ambiguous data conflicts corresponding to the particular interactive list item.

2. The one or more non-transitory computer-readable media of claim 1, wherein the plurality of ambiguous data conflicts are detected at the local deployment.

3. The one or more non-transitory computer-readable media of claim 1, wherein the plurality of predefined data conflict types are selected from a group consisting of resolution data conflict type, object type data conflict type, title data conflict type, deletion data conflict type, photo data conflict type, and geotime data conflict type.

4. The one or more non-transitory computer-readable media of claim 1, wherein the particular predefined data conflict type represents a type of data conflict resulting from concurrent, non-matching changes to a type value for a data object at the local deployment and a type value for the same data object at the peer deployment.

5. The one or more non-transitory computer-readable media of claim 1, wherein the particular predefined data conflict type represents a type of data conflict resulting from concurrent, non-matching changes to a title value for a data object at the local deployment and a title value for the same data object at the peer deployment.

6. The one or more non-transitory computer-readable media of claim 1, wherein the particular predefined data conflict type represents a type of data conflict resulting from concurrent, non-matching changes to a digital photo for a data object at the local deployment and a digital photo for the same data object at the peer deployment.

7. The one or more non-transitory computer-readable media of claim 1, wherein the particular predefined data conflict type represents a type of data conflict resulting from a modification to a data object at the local deployment and a concurrent deletion of the same data object at the peer deployment.

8. The one or more non-transitory computer-readable media of claim 1, wherein the particular predefined data conflict type represents a type of data conflict resulting from concurrent, non-matching changes to a time range value for a data object at the local deployment and a time range value for the same data object at the peer deployment.

9. The one or more non-transitory computer-readable media of claim 1, wherein the particular predefined data conflict type represents a type of data conflict resulting from concurrent resolution of multiple data objects differently at the local deployment and the peer deployment.

10. The one or more non-transitory computer-readable media of claim 1, the method further comprising:
    determining a subset of the plurality of ambiguous data conflicts that all are of the particular predefined data conflict type; and
    providing graphical user interface controls that allow the user, by activating the graphical user interface controls, to resolve all of the subset of ambiguous data conflicts at the same time.

11. In a peering network comprising a local deployment and a peer deployment having a peering relationship, a method for assisting a user in deconflicting concurrency conflicts, the method comprising:
    detecting a plurality of ambiguous data conflicts between the local deployment and the peer deployment;
    providing a graphical user interface comprising interactive controls for each of a plurality of predefined data conflict types;
    wherein the interactive controls for each predefined data conflict type of the plurality of predefined data conflict types is for filtering the plurality of ambiguous data conflicts by that each predefined data conflict type;
    responsive to receiving a selection of a particular predefined data conflict type of the plurality of predefined data conflict types, providing a graphical user interface comprising a listing of interactive list items, each interactive list item of the interactive list items representing (a) a different sub-data conflict type of the particular predefined data conflict type, and (b) one or more corresponding ambiguous data conflicts, of the plurality of ambiguous data conflicts, that are of the different sub-data conflict type, of the particular predefined data conflict type, represented by the each interactive list item;
    responsive to receiving a selection of a particular interactive list item of the interactive list items, providing a graphical user interface that allows a user to resolve one or more of the one or more ambiguous data conflicts corresponding to the particular interactive list item; and
    wherein the method is performed by one or more computing devices.

12. The method of claim 11, wherein the plurality of ambiguous data conflicts are detected at the local deployment.

13. The method of claim 11, wherein the plurality of predefined data conflict types are selected from a group consisting of resolution data conflict type, object type data conflict type, title data conflict type, deletion data conflict type, photo data conflict type, and geotime data conflict type.

14. The method of claim 11, wherein the particular predefined data conflict type represents a type of data conflict resulting from concurrent, non-matching changes to a type value for a data object at the local deployment and a type value for the same data object at the peer deployment.

15. The method of claim 11, wherein the particular predefined data conflict type represents a type of data conflict resulting from concurrent, non-matching changes to a title value for a data object at the local deployment and a title value for the same data object at the peer deployment.

16. The method of claim 11, wherein the particular predefined data conflict type represents a type of data conflict resulting from concurrent, non-matching changes to a digital photo for a data object at the local deployment and a digital photo for the same data object at the peer deployment.

17. The method of claim 11, wherein the particular predefined data conflict type represents a type of data conflict resulting from a modification to a data object at the local deployment and a concurrent deletion of the same data object at the peer deployment.

18. The method of claim 11, further comprising:

determining a subset of the plurality of ambiguous data conflicts that all are of the particular predefined data conflict type; and providing graphical user interface controls that allow the user, by activating the graphical user interface controls, to resolve all of the subset of ambiguous data conflicts at the same time.

* * * * *